(12) United States Patent
Wang et al.

(10) Patent No.: US 10,796,231 B2
(45) Date of Patent: *Oct. 6, 2020

(54) COMPUTER-IMPLEMENTED SYSTEMS AND METHODS FOR PREPARING COMPLIANCE FORMS TO MEET REGULATORY REQUIREMENTS

(71) Applicant: INTUIT INC., Mountain View, CA (US)

(72) Inventors: Gang Wang, San Diego, CA (US); Luis Felipe Cabrera, Bellevue, WA (US); Kevin M. McCluskey, Carlsbad, CA (US); Alex G. Balazs, San Diego, CA (US); Per-Kristian G. Halvorsen, Los Altos Hills, CA (US); Amir R. Eftekhari, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 1092 days.

This patent is subject to a terminal disclaimer.

(21) Appl. No.: 15/220,119

(22) Filed: Jul. 26, 2016

(65) Prior Publication Data

US 2018/0032855 A1 Feb. 1, 2018

(51) Int. Cl.
*G06F 16/332* (2019.01)
*G06N 5/02* (2006.01)
(Continued)

(52) U.S. Cl.
CPC ......... *G06N 5/022* (2013.01); *G06F 16/3329* (2019.01); *G06N 5/045* (2013.01);
(Continued)

(58) Field of Classification Search
USPC ........................................... 705/317, 31, 32
See application file for complete search history.

(56) References Cited

U.S. PATENT DOCUMENTS 4,213,251 A 7/1980 Foundos
4,809,219 A 2/1989 Ashford et al.
(Continued)

FOREIGN PATENT DOCUMENTS

JP 2002-117121 A 4/2002
JP 2005-190425 A 7/2005
(Continued)

OTHER PUBLICATIONS

15220119 NPL—EIC 3600 Search Report 021220 (dated 2020).*
(Continued)

*Primary Examiner* — Andrew B Whitaker
*Assistant Examiner* — Johnathan J Lindsey, III
(74) *Attorney, Agent, or Firm* — DLA Piper LLP (US)

(57) ABSTRACT

Computer-implemented systems, methods and articles for preparing and/or submitting a plurality of different types of compliance forms for submission to a regulatory agency. The system includes a computing device, a data store, and a compliance form software program executable by the computing device. The compliance program includes a universal calculation engine, logic agent and user interface manager which are configured to process a respective domain model configured for each type of compliance form. Each domain model includes a calculation graph, a completeness model comprising decision table(s) and/or completeness graph(s), user interface assets and filing rules configured specifically for a particular type of compliance form. The rules and regulations for each type of compliance form are embodied in the declaratory data structures of the respective calculation graph and completeness graph for each domain model. The calculation engine and logic agent are configured to process the calculation graph and completeness graph, respectively.

22 Claims, 17 Drawing Sheets

(51) Int. Cl.
  *G06N 5/04* (2006.01)
  *G06Q 10/10* (2012.01)
  *G06Q 30/04* (2012.01)
  *G06Q 50/18* (2012.01)

(52) U.S. Cl.
  CPC ............ *G06Q 10/10* (2013.01); *G06Q 30/04* (2013.01); *G06Q 50/18* (2013.01)

(56) References Cited

U.S. PATENT DOCUMENTS

| | | |
|---|---|---|
| 5,006,998 A | 4/1991 | Yasunobu |
| 5,495,607 A | 2/1996 | Pisello et al. |
| 5,557,761 A | 9/1996 | Chan et al. |
| 5,673,369 A | 9/1997 | Kim |
| 5,742,836 A | 4/1998 | Turpin et al. |
| 5,819,249 A | 10/1998 | Dohanich |
| 6,078,898 A | 6/2000 | Davis |
| 6,535,883 B1 | 3/2003 | Lee et al. |
| 6,601,055 B1 | 7/2003 | Roberts |
| 6,631,361 B1 | 10/2003 | O'Flaherty et al. |
| 6,670,969 B1 | 12/2003 | Halstead et al. |
| 6,690,854 B2 | 2/2004 | Helbing |
| 6,697,787 B1 | 2/2004 | Miller |
| 6,898,573 B1 | 5/2005 | Piehl |
| 6,912,508 B1 | 6/2005 | McCalden |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak et al. |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison et al. |
| 7,716,094 B1 | 5/2010 | Sutter et al. |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson et al. |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 8,001,006 B1 | 8/2011 | Yu et al. |
| 8,019,664 B1 | 9/2011 | Tifford et al. |
| 8,082,144 B1 | 12/2011 | Brown et al. |
| 8,086,970 B2 | 12/2011 | Achtermann et al. |
| 8,108,258 B1 | 1/2012 | Slattery |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 | 3/2013 | Eftekhari et al. |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 | 5/2013 | Talan |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt et al. |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 8,892,467 B1 | 11/2014 | Ball |
| 8,949,270 B2 | 2/2015 | Newton et al. |
| 9,372,687 B1 | 6/2016 | Pai |
| 9,690,854 B2 | 6/2017 | Stent et al. |
| 9,760,953 B1 | 9/2017 | Wang et al. |
| 9,916,628 B1 | 3/2018 | Wang et al. |
| 9,922,376 B1* | 3/2018 | Wang .................. G06Q 40/123 |
| 9,990,678 B1 | 6/2018 | Cabrera et al. |
| 2002/0065831 A1 | 5/2002 | DePaolo |
| 2002/0107698 A1 | 8/2002 | Brown et al. |
| 2002/0111888 A1* | 8/2002 | Stanley .................. G06Q 40/02 705/31 |
| 2002/0161799 A1* | 10/2002 | Maguire, III ........... G06F 40/18 715/212 |
| 2002/0174017 A1 | 11/2002 | Singh |
| 2002/0198832 A1 | 12/2002 | Agee |
| 2003/0069983 A1* | 4/2003 | Mukund .............. G06Q 10/109 709/229 |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah et al. |
| 2004/0078271 A1 | 4/2004 | Morano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1* | 9/2004 | Barthel ..................... G06N 5/04 705/31 |
| 2004/0181543 A1 | 9/2004 | Wu et al. |
| 2004/0205008 A1 | 10/2004 | Haynie et al. |
| 2005/0171822 A1 | 8/2005 | Cagan |
| 2005/0216379 A1 | 9/2005 | Ozaki |
| 2005/0262191 A1 | 11/2005 | Mamou et al. |
| 2006/0112114 A1 | 5/2006 | Yu |
| 2006/0155618 A1 | 7/2006 | Wyle |
| 2006/0155632 A1 | 7/2006 | Cherkas et al. |
| 2006/0178961 A1 | 8/2006 | Stanley et al. |
| 2006/0282354 A1* | 12/2006 | Varghese ............... G06Q 40/128 705/32 |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0055571 A1 | 3/2007 | Fox et al. |
| 2007/0094207 A1 | 4/2007 | Yu et al. |
| 2007/0136157 A1* | 6/2007 | Neher, III .............. G06Q 40/02 705/31 |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |

(56) References Cited

U.S. PATENT DOCUMENTS

| | | |
|---|---|---|
| 2008/0177631 A1 | 7/2008 | William |
| 2008/0215392 A1 | 9/2008 | Rajan |
| 2008/0243531 A1 | 10/2008 | Hyder et al. |
| 2009/0012884 A1* | 1/2009 | Harman ............... G06Q 10/10 705/31 |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendorf et al. |
| 2010/0131394 A1 | 5/2010 | Rutsch et al. |
| 2010/0153138 A1* | 6/2010 | Evans ............... G06Q 10/10 705/4 |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1* | 5/2012 | Eftekhari ............... G06Q 40/02 705/31 |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0052653 A1* | 2/2014 | Schwenk ............... G06Q 30/018 705/317 |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1* | 11/2014 | Barsade ............... G06Q 40/123 705/31 |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0042275 A1* | 2/2016 | Dettman ............... G06N 5/003 706/46 |
| 2016/0063645 A1 | 3/2016 | Houseworth et al. |
| 2016/0071112 A1 | 3/2016 | Unser |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1* | 1/2017 | Wang ............... G06Q 40/123 |
| 2017/0004584 A1 | 1/2017 | Wang |
| 2017/0032468 A1 | 2/2017 | Wang et al. |
| 2017/0186098 A1* | 6/2017 | Lubczynski ......... G06Q 40/123 |
| 2017/0186099 A1* | 6/2017 | Lubczynski ......... G06Q 40/123 |
| 2017/0316513 A1* | 11/2017 | Hubbard ............... G06Q 40/123 |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

15220119 NPL—EIC 3600 Search Report 021820 (dated 2020).*
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, dated Jan. 11, 2018, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).

(56) References Cited

OTHER PUBLICATIONS

Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, dated Jan. 11, 2018, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).

(56) References Cited

OTHER PUBLICATIONS

Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/462,411 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Communication pursuant to Rules 70(2) and 70a(2) EPC dated Apr. 25, 2018 in European Patent Application No. 16843282.1-1217, (1page).
PCT International Search Report for PCT/US2017/062777, Applicant: Intuit Inc., Form PCT/ISA/210 and 220, dated: Feb. 21, 2018 (5pages).
PCT Written Opinion of the International Search Authority for PCT/US2017/062777, Applicant: The Regents of the University of California, Form PCT/ISA/237, dated: Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
http://en.wikipedia.org/wiki/Dependency_grammar#Semantic_dependencies, printed Mar. 11, 2014.
http://www.webopedia.com/TERM/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports--graphs-and-snapshots/track-the-earnings-taxes--deductions--or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.

(56) References Cited

OTHER PUBLICATIONS

Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Vanderbilt University, "Free tax prep help available for Vanderbilt employees", Feb. 6, 2014, Vanderbilt University, p. 1-3 [NPL-1].
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).

(56) References Cited

OTHER PUBLICATIONS

Amendment and Response dated Jun. 2, 2017 in U.S. Appl. No. 14/448,986, (12pages)
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121,(29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646,(65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Office Action dated Sep. 14, 2017 in U.S. Appl. No. 14/530,159, (41pages).
Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.

* cited by examiner

|       | $Q_A$ | $Q_B$ | $Q_C$ | $Q_D$ | $Q_E$ | $Q_F$ | $Q_G$ | Goal |
|-------|-------|-------|-------|-------|-------|-------|-------|------|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule₁ | Y | ? | ? | ? | N | ? | ? | 40% | 10% |
| Rule₂ | N | Y | Y | ? | ? | ? | N | 20% | 5% |
| Rule₃ | N | Y | N | Y | ? | N | ? | 14% | 6% |
| Rule₄ | Y | ? | ? | ? | N | Y | N | 65% | 20% |
| Rule₅ | N | Y | N | ? | ? | ? | Y | 18% | 40% |
| Rule₆ | Y | Y | N | ? | ? | N | ? | 5% | 25% |

FIG. 6

COMPUTER-IMPLEMENTED SYSTEMS AND METHODS FOR PREPARING COMPLIANCE FORMS TO MEET REGULATORY REQUIREMENTS

SUMMARY

Embodiments of the present invention are directed to computerized systems and methods for preparing and/or submitting compliance forms for meeting compliance requirements, such as applications and forms for permits, licenses, immigration cards, tax filings, etc.

There are many activities of individuals and businesses which are subject to compliance with rules and regulations. Some examples or such activities include obtaining permits and licenses to perform certain activities such as driver's licenses, vehicle registrations, marriage licenses, business licenses, building permits, licenses to sell alcohol, professional licenses (e.g., investment licenses, attorney licenses, insurance licenses, healthcare provider licenses, etc.), and the like. There are also regulatory compliance requirements for taxation on property, taxation on business income (e.g., tax returns), taxation on personal income (e.g., tax returns), employer payroll tax forms, immigration procedures, applications for government programs and assistance, etc. In each case, the compliance entity, be it an individual or business entity, must submit a compliance form, such as an application or other form, to satisfy the required compliance process. Once completed, the compliance form must be submitted to an official agency in the jurisdiction which is responsible for reviewing regulatory compliance. The responsible agency may accept paper compliance forms and/or electronic submissions, depending on the systems and requirements of each agency. For example, some agencies have systems which allow compliance forms to completed and/or submitted in electronic form, while some agencies may require or allow compliance forms to be completed and submitted on paper, and some agencies accept both paper forms and electronic forms. As an example, the Internal Revenue Service ("IRS") accepts both paper tax returns and electronic tax returns. Some agencies also have their own websites which allow an entity to complete and submit an electronic compliance form on the website. Similarly, some private entities, such as Intuit, Inc. of Mountain View, Calif., have developed websites and software for preparing electronic compliance forms, such as tax returns prepared using the website at WWW.TURBOTAX.COM™ or Turbotax™ desktop software, as well as electronically transmitting the completed compliance forms to the responsible agency.

Although various computerized systems and software programs have previously been provided for preparing compliance forms such as tax returns, there has been no computerized system that supports the processing of a variety of different types of compliance forms which is quickly and easily adaptable to prepare any of a multitude of different types of compliance forms, while also allowing changes to compliance requirements to be simply and efficiently implemented.

Accordingly, one embodiment of the present invention is directed to a computerized compliance form preparation system (also referred to as a "compliance system" or "compliance form system") for preparing a plurality of different types of compliance forms for submission to a respective responsible agency having the authority to review the respective type of compliance form. The compliance system may also have the capability to check whether a compliance form being prepared on the system has any errors and/or meets the regulatory rules for an acceptable compliance form, provide an explanation of errors identified in the compliance form, assist a user in correcting any errors and/or deficiencies in the compliance form, execute a payment transaction for the submission of the compliance form, and/or submit the compliance form to the responsible agency.

More specifically, the compliance system includes a computing device having a computer processor and memory. The compliance system further includes a data store in communication with the computing device. The data store is configured to store compliance data specific to a particular entity for which a compliance form is being prepared (also referred to as "entity-specific compliance data"), such as compliance form data fields and calculated compliance form data fields. For example, the system may access entity-specific compliance data from any suitable source, such as data input by a user, or data electronically accessed from a database having applicable entity-specific compliance data. The data may be input by a user in response to a series of interview screens that selectively ask questions and/or request compliance data needed to complete a compliance form. As some examples, the entity-specific data may include input data required for completing the compliance form, such as the entity name, address, tax identification number (e.g., Employer Identification Number (EIN), social security number (SSN)), etc. The entity-specific compliance data also includes data specific to the type of compliance form. For instance, compliance data for a vehicle registration may require the vehicle make, model, model year, license plate number, and/or vehicle identification number. In contrast, compliance data for preparing an employer payroll tax form may include an EIN, employer name and address, wages, tips and compensation paid to employees, federal income tax withheld from the employees, taxable social security wages and tips, taxable Medicare wages and tips, adjustments, etc.

The compliance system also includes a compliance form preparation software application (also referred to as the "compliance program") executable by the computing device. The compliance program includes a universal calculation engine, logic agent and user interface manager which are each configured to utilize a construct in which the rules and calculations for preparing each type of compliance form are established in type-specific domain models having declarative data structures, rather than being rigidly programmed for processing a particular type of compliance form. In other words, the system has a specific domain model for each type of compliance form, and the calculation engine, logic agent and user interface manager are configured to process each type of compliance form using the respective domain model for the particular type of compliance form being prepared by the system. The declarative data structures for each domain model are embodied in completeness model(s) and calculation graph(s) which are independent and separate from the calculation engine, logic agent and user interface, allowing the universal calculation engine, logic agent and user interface to process a plurality of different types of compliance forms by utilizing the respective domain model for the particular compliance form.

For each domain model, the calculation graph(s) comprise a plurality of interconnected calculation nodes including one or more input nodes, function nodes, and/or functional nodes embodying the calculations and logic operations as defined by the rules and regulations required for preparing the particular compliance form for such domain model. For a respective domain model, the calculation graph which includes all of the calculations and logic operations for a particular domain model, or a plurality of calculation graphs in which each calculation graph covers a one or more particular compliance topics and/or sub-topics.

The calculation engine is configured to perform a plurality of calculations and logic operations based on the calculation graph. The compliance program is executable by the computing device to execute the calculation engine to establish a connection to the data store, read and write entity-specific compliance data to and from the shared data store, and perform calculations and logic operations using the entity-specific compliance data based on the calculation graph.

For each domain model, the completeness model, also referred to herein as a "completion model," comprises a data structure that captures all the conditions necessary to obtain all of the compliance data necessary to complete the respective compliance form for submission to a responsible agency. The completeness model may be embodied in various forms. The completeness model may be completeness graph(s) (also referred to as "completion graphs") such as a decision tree, or the completeness model(s) may be in the form of decision tables representing compliance questions for obtaining entity=specific compliance data and the logic relating the compliance questions to other compliance questions and/or completion of the a compliance topic or the entire compliance form (e.g., the decision tables may be generated from completeness graph(s), as described herein). For instance, answers and/or entry of compliance data in response to certain compliance data questions are logically related to other compliance data questions in the decision table and/or a completion goal for compliance tax topic or the entire compliance form indicating that the tax topic or the compliance form is completed. Similar to the calculation graph(s), a single completeness graph can comprehensively cover an entire compliance form, or the completeness graph can be a plurality of completeness graphs each covering particular compliance topics and/or sub-topics which may combined to form the overall completeness graph.

The logic agent is configured to review current run-time data including the compliance data currently obtained, evaluate missing compliance data utilizing the completeness graph, and output one or more suggested compliance questions for obtaining missing compliance data. The compliance program is executable by the computing device to execute the logic agent to review current run-time data including the compliance data currently obtained, evaluate missing tax data utilizing the completeness graph, and output one or more suggestions for obtaining missing compliance data to the user interface manager.

The user interface manager is configured to receive the one or more suggested compliance questions from the logic agent, and analyze the suggested compliance question(s). The user interface manager utilizes the suggested compliance question(s) to determine a compliance question to present to a user of the compliance system. The user interface manager may select one of the suggested compliance question(s), or it may ignore the suggestions and present a different questions or prompt to the user. The user interface manager then presents the determined compliance question to the user. For example, the user interface manager may be configured to generate and display a question screen to the user. The question screen may include a question for the user requesting compliance data for an entity and also be configured to receive the compliance data from the user in the form of input from the user.

In the event that all compliance data needed to complete the compliance form has been obtained, the logic agent, instead of outputting one or more suggested compliance questions for missing compliance data may output a "done" instruction to the user interface manager. The compliance program is configured to then prepare the compliance form based on the compliance data in the shared data store. For instance, the compliance program may include a services module configured to utilize the compliance data to prepare and/or submit the compliance form, such as generating an electronic document of a completed compliance form, print a paper copy of a completed compliance form, and/or electronically transmit a data file representing a completed compliance form to the responsible agency.

The computing device may be a remotely located computing device that is separate from another computing device that contains a user interface. For example, a user may run a browser or application on a mobile device such as a laptop, tablet, Smartphone, or the like which contains the user interface. Of course, a personal computer may also be used in this manner in which a remotely located computer is used to implement core functions of the compliance program. A remotely located computing device may execute one or more modules of the system, for example, the calculation engine, the logic agent, and the user interface manager. Alternatively, software modules may be incorporated into a single computing device that includes the user interface aspect.

In another aspect of the present invention, the compliance system is configured to analyze the compliance data and identify errors in the preparation of a compliance form. In one aspect, the compliance system further comprises a schema error module having a plurality of error rules in the form of meta data generated from schema requirements for each particular compliance form. An error check engine is configured to check the compliance form being prepared against the error rules to identify error in the preparation of the compliance form. In another aspect, the compliance system may utilize an error graph, similar to the calculation graphs, to identify errors. Each domain model has a respective error graph for identifying error rules for the respective compliance form. Each error graph semantically describes data dependent operations which embody error rules for identifying errors in the preparation of a compliance form and comprise a plurality of interconnected nodes including one or more of input nodes, function nodes, and/or functional nodes, which are configured to be processed by the error check engine to determine errors in the respective compliance form. The error check engine is configured to process the error graph to identify errors in the preparation of a respective compliance form.

In another aspect of the present invention, the compliance system is also configured to provide explanations to a user regarding the preparation of a compliance form. The explanations may include explanations of a result of a compliance form such as a result in a calculation of the compliance form, and/or explanations of changes in a compliance form caused by a change in an entity's compliance data or a change in the rules or regulations for a compliance form. On or more nodes of the calculation graph and/or the error graph are associated with a respective explanation of a result of each node. The compliance system further comprises an explanation engine configured to generate a narrative explanation utilizing the error explanation associated with a particular node. The explanation may then be provided the user via the user interface manager.

In yet another aspect of the present invention, the compliance system may also be configured to handle the payment of fees which are associated with the submission of a compliance form. For instance, a compliance form may require an application fee and/or payment of a fee as determined and/or calculated by the compliance form, such as a tax, license fee, etc. The compliance system may further comprise a payment module configured to process a variety of payment modes, such as automated clearing house payments ("ACH"), electronic bank transfers, credit card payments, payments via online payment systems (e.g., PAYPAL™) and/or other suitable electronic payment modes. The payment module may be integrated with the services module, or it may be a separate module.

In still another aspect, the compliance system may also be configured to obtain payment from user for use of the compliance system to prepare and/or submit a compliance form. The payment module may be configured to process a payment for use of the compliance system same or similar to processing a payment for fees associated with a compliance form, as described herein.

Another embodiment of the present invention is directed to computer-implemented methods for preparing a plurality of types of compliance forms for submission to a respective responsible agency having authority to review the respective type of compliance form. The methods may be implemented, for example, on the compliance system described above. In one embodiment, the method includes a compliance form system, same or similar to that described above, executing a compliance form preparation software application. The payroll calculation engine reads the employer-specific tax data from the shared data store, performs a plurality of payroll calculation operations, and writes calculated payroll data for a plurality of payroll data fields to the shared data store.

The logic agent reads runtime data of the compliance form being prepared and utilizes the completeness model to evaluate missing compliance data needed to complete the compliance form. The logic agent determines one or more suggested compliance questions for obtaining the missing compliance data, and provides the suggested compliance questions for the user interface manager.

The user interface manager receives the suggested compliance questions from the tax logic agent, analyzes the suggested compliance questions, and determines a compliance question to present to a user. The user interface manager then presents the compliance question to the user.

In additional aspects of present invention, the computer-implemented method may include any of the additional aspects described herein for the system for preparing a plurality of types of compliance forms for submission to a respective responsible agency, such as identifying errors, providing explanations of results and errors, and/or processing payments for fees.

Another embodiment of the present invention is directed to an article of manufacture comprising a non-transitory computer readable medium embodying instructions executable by a computer to execute a process according to any of the method embodiments of the present invention for preparing a plurality of types of compliance forms for submission to a respective responsible agency having authority to review the respective type of compliance form. The computer-readable medium may embody instructions executable by the computing device of a compliance form system same or similar to the compliance system described above. For example, the process may comprise a compliance form system executing a compliance form software program, as described above. The calculation engine reads entity-specific compliance data from the shared data store, calculates a calculation graph by performing calculations and logic operations based on the calculation graph using the entity-specific compliance data, and writes calculated compliance data to the shared data store. The logic agent reads runtime data of the compliance form being prepared and utilizes the completeness model to evaluate missing compliance data needed to complete the compliance form. The logic agent determines one or more suggested compliance questions for obtaining the missing compliance data, and provides the suggested compliance questions for the user interface manager. The user interface manager receives the suggested compliance questions from the tax logic agent, analyzes the suggested compliance questions, and determines a compliance question to present to a user. The user interface manager then presents the compliance question to the user.

In additional aspects of present invention, the computer-implemented method may include any of the additional aspects described herein for the systems and methods for preparing a plurality of types of compliance forms for submission to a respective responsible agency, such as identifying errors, providing explanations of results and errors, and/or processing payments for fees.

The compliance system of the present invention improves the functioning of the computer by providing faster and more flexible computing and generation of compliance forms. The compliance system is able to process and compute different types of compliance forms by simply generating a domain model for the particular compliance form, without having to re-program the entire compliance program. In addition, the use of calculation graphs and error graphs allows the compliance system to process and calculate a high volume of compliance forms being prepared concurrently, or in short succession. The calculation graphs and error graphs allow for more efficiently utilizing the computing power of the system by optimizing the number of questions required to be asked to obtain all of the required tax data for preparing a respective compliance form and only requiring those calculations which are relevant to each respective compliance tax form. These features increase the flexibility of the system, increase the speed of calculations resulting in faster calculations and reduced computer processing time, and require less memory resources when preparing and calculating compliance forms. Especially when preparing and calculating high volumes of compliance form, such as hundreds, thousands, millions or more per time period, such as a day, week or month, the compliance system of the present invention significantly improves the operation of the computer, while also improving various technologies and/or technical fields, including computerized preparation of compliance forms, computerized calculation of compliance forms, and computerized form preparation systems. Accordingly, the present invention is rooted in computer technology involving specific computer components, intercommunications between computing modules, data structures and logic structures which improve the operation of the computer and also improve the technologies and technical fields recited above.

BRIEF DESCRIPTION OF THE DRAWINGS

FIG. 5 illustrates a decision table based on or derived from the completeness graph of FIG. 4.

FIG. 6 illustrates another embodiment of a decision table that incorporates statistical data.

DETAILED DESCRIPTION OF ILLUSTRATED EMBODIMENTS

Figure 1:
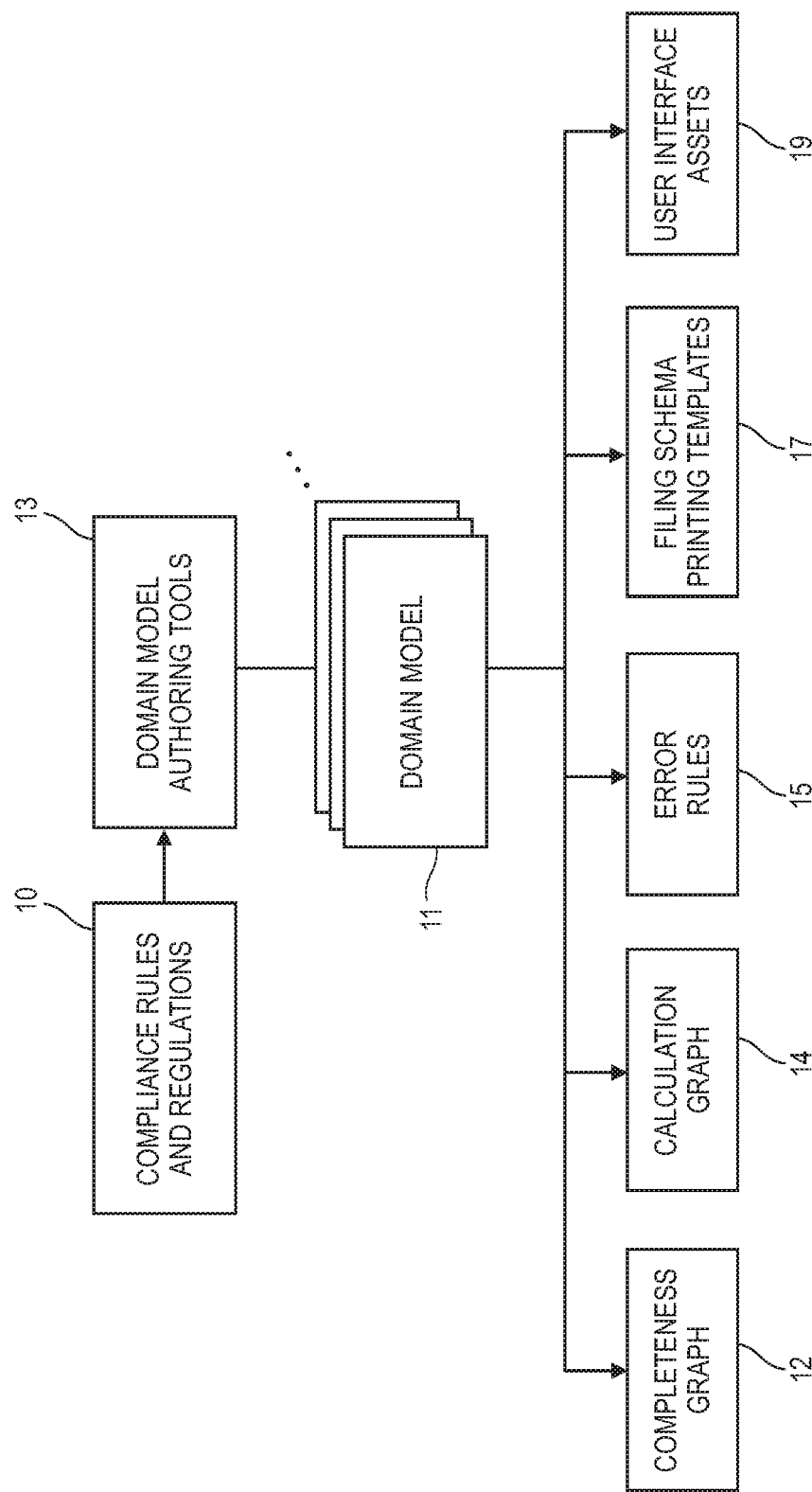
FIG. 1 schematically illustrates how compliance form rules and regulations are established in a respective domain model for each compliance form, according to one embodiment.

Embodiments of the present invention are directed to systems, methods and articles of manufacture for preparing and/or submitting a plurality of different types of compliance forms for submission to a respective responsible agency having the authority to review the respective type of compliance form. As some examples, the various different types of compliance forms may include applications and/or forms for payroll taxes, driver's licenses, vehicle registrations, professional licenses, insurance licenses, building permits, healthcare provider licenses, marriage licenses, immigration, etc. According to the present invention, the compliance form system is configured to utilize a universal calculation engine, logic agent and user interface manager which are capable of processing each of a plurality of compliance type-specific domain models in which the respective rules and calculations for each compliance form are established in declarative data structures, including a calculation graph and a completeness graph. Thus, for each type of compliance form, the compliance system has a different domain model such that the calculation engine, logic agent and user interface manager utilize the respective domain model to prepare a corresponding compliance form for which the domain model is configured. For example, a first domain model may be configured for preparing and/or submitting a payroll tax form for submission to the Internal Revenue Service ("IRS"), a second domain model may be configured to prepare and/or submit an application for a liquor license to a state liquor licensing agency, a third domain model may be configured to prepare and/or submit a work visa application to the U.S. Department State, and so on. The rules and calculations for each compliance form are established in a respective domain model having declarative data structures. More specifically, each domain model includes a calculation graph and a completeness graph which embody the rules and calculations for a respective compliance form. The compliance system is configured to access entity-specific compliance data for preparing a selected compliance form for an entity from data sources and/or through the user interface manager. The calculation engine is configured to use the entity-specific compliance to dynamically perform a plurality of calculations and logic operations based on the calculation graph for the selected compliance form. The logic agent is configured to review current run-time data in preparing the selected compliance form (i.e., the accessed entity-specific compliance data), evaluate missing data utilizing the completeness graph, and output one or more suggested compliance questions for obtaining the missing compliance data to the user interface manager. The user interface manager is configured to analyze the suggested compliance questions to determine a compliance question to present to a user of the compliance system. This process is continued until the logic agent determines that all of the required entity-specific compliance data required to complete the selected compliance form has been obtained. The compliance system then prepares the compliance form and may also automatically submit the completed compliance form to the responsible agency.

In contrast to the rigidly defined user interface screens used in prior software applications for preparing compliance forms, such as tax return preparation software, the present inventions provides a compliance system 40 (see FIG. 7) having a compliance form preparation software application 100 (referred to as "compliance program 100") that runs on computing devices 102, 103 (see FIG. 13) and operates on a new construct in which compliance rules and the calculations based thereon are established in declarative data-structures, namely, completeness graph(s) and tax calculation graph(s). Completeness graphs 12 (see e.g. FIGS. 1-3) and calculation graphs 14 (see e.g., FIG. 6) are data structures in the form of trees having nodes and interconnections between the nodes indicating interdependencies. Completeness graph 12 identifies each of the conditions (e.g. questions, criteria, conditions) which may be required to be satisfied to complete a particular tax topic or a complete tax return, and also identifies when all conditions have been satisfied to complete a particular compliance form. The tax calculation graphs 14 semantically describe data dependent nodes, including input nodes, functional nodes, functions, and tax operations, that perform calculations or operations in accordance with the rules and regulations for a particular compliance form.

Referring first to FIG. 1, a schematic graphically illustrates how compliance rules and regulations 10 for each compliance form are established in respective domain models 11. The compliance rules and regulations 10 are promulgated by a responsible authority, such as a legislative body, administrative agency, and/or agency responsible for the respective compliance form. Domain model authoring tools 13 may be utilized to generate a domain model 11 embodying the compliance rules and regulations 10. The authoring tools 13 may include a user interface (e.g., a graphical user interface) for generating the components of the domain models 11, which allows a user to generate the components using widgets, icons and other graphical tools to create declarative data structures (as described in more detail below), functions, forms, graphics, narrative text, etc. Each domain model 11 may include one or more of the following components: a completeness graph 12; a calculation graph 14 error rules and/or error graphs; filing schema and printing templates; and/or user interface assets. Each of these components and their use in the compliance system 40 are described in further detail below.

Figure 2:
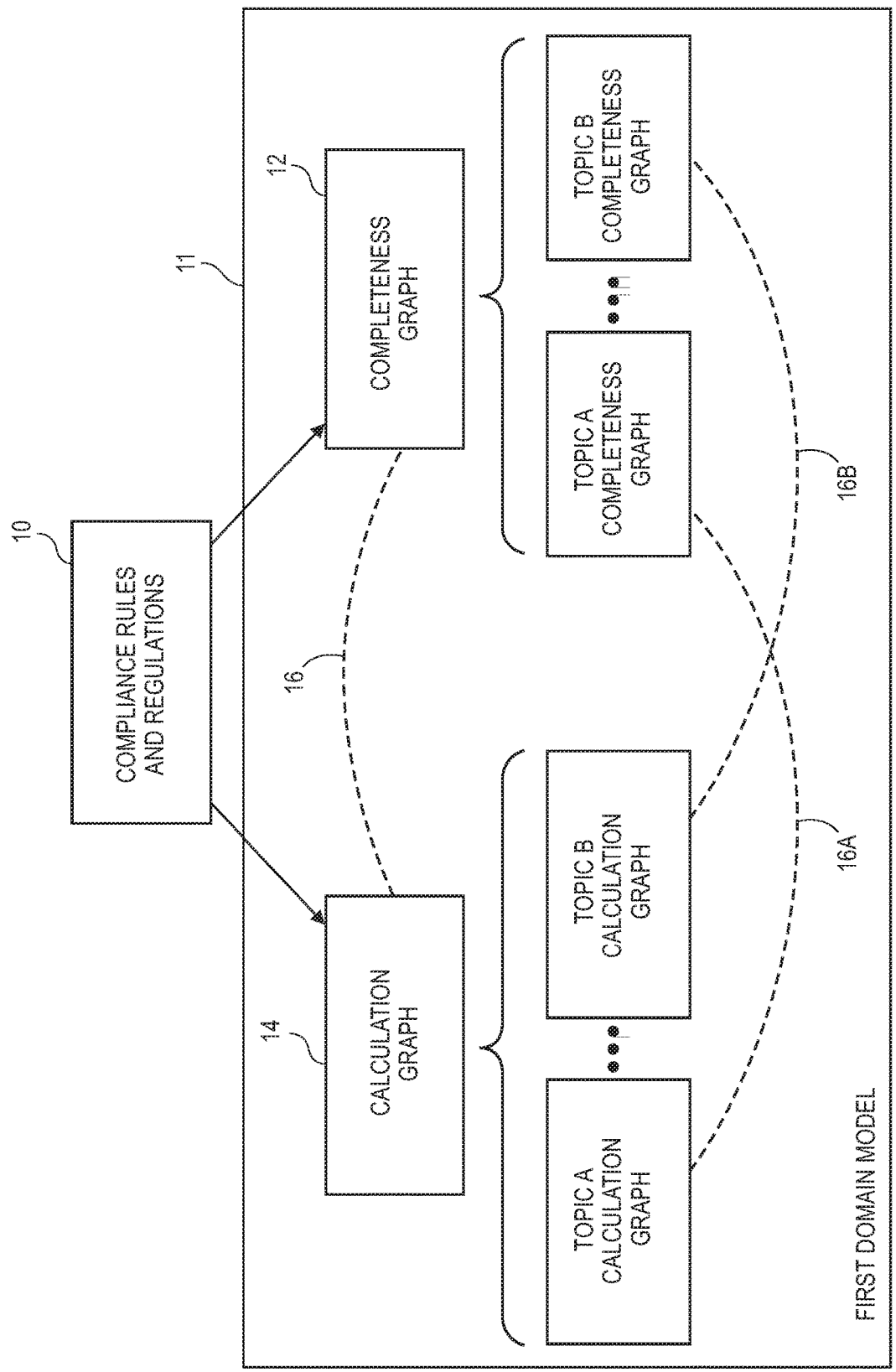
FIG. 2 schematically illustrates how compliance form rules are parsed and represented by a completeness graph and a tax calculation graph, according to one embodiment.

FIG. 2 illustrates graphically how compliance rules and regulations 10 for a first compliance form are established in declarative data structures comprising a completeness graph 12 and a calculation graph 14. In one aspect of the invention, compliance rules 10 may be parsed or broken into various topics. For example, for a payroll tax form, there are a number of payroll topics that need to be covered for completing a federal payroll tax form, such as IRS forms Form 940, form 941 and Form 944. When compliance rules 10 are broken down into various topics or sub-topics, in one embodiment of the invention, each particular topic (e.g., topics A, B) may each have their own dedicated completeness graph 12A, 12B and payroll calculation graph 14A, 14B as seen in FIG. 1. Still, when broken down into topics and/or sub-topics, the set of completeness graphs and the set of calculation graphs are referred to collectively as "the completeness graph" and "the calculation graph" for the particular compliance form. The set of the completeness graph 12 and calculation graph 14 for a particular type of compliance form make up at least a part of a first domain model 11 (see FIG. 7) for the first compliance form.

Additional domain models 11 for different types of compliance forms are generated similar to the first domain model 11 utilizing compliance rules and regulations for each respective compliance form, such as second compliance rules and regulations for generating a second domain model 11 comprising a second completeness graph 12 and a second calculation graph 14, third compliance rules for generating a third domain model 11 comprising a third completeness graph 12 and a third calculation graph 14, and so on.

Note that in FIG. 1, the completeness graph 12 and the calculation graph 14 are interdependent as illustrated by dashed line 16. That is to say, some elements contained within the completeness graph 12 may be needed to perform actual compliance form calculations using the calculation graph 14. Likewise, aspects within the calculation graph 14 may be needed as part of the completeness graph 12. Taken collectively, the completeness graph 12 and the tax calculation graph 14 represent data structures that capture all the conditions necessary to complete the computations that are required to complete each respective compliance form. The completeness graph 12, for example, determines when all conditions have been satisfied such that a complete compliance form can be prepared with the existing compliance data. The completeness graph 12 is used to determine, for example, that no additional data input is needed to prepare and ultimately print or file the respective compliance form. The completeness graph 12 is used to determine when a particular schema contains sufficient information such that a completed compliance form can be prepared and submitted. Individual combinations of completeness graphs 12 and payroll calculation graphs 14 that relate to one or more topics can be used to complete the computations required for some sub-calculations. In the context of a payroll tax form, for example, a sub-selection of topical completeness graphs 12 and tax calculation graphs 14 can be used for intermediate tax results such as total taxes before adjustments, adjustments, total taxes after adjustments, and the like.

Figure 3:
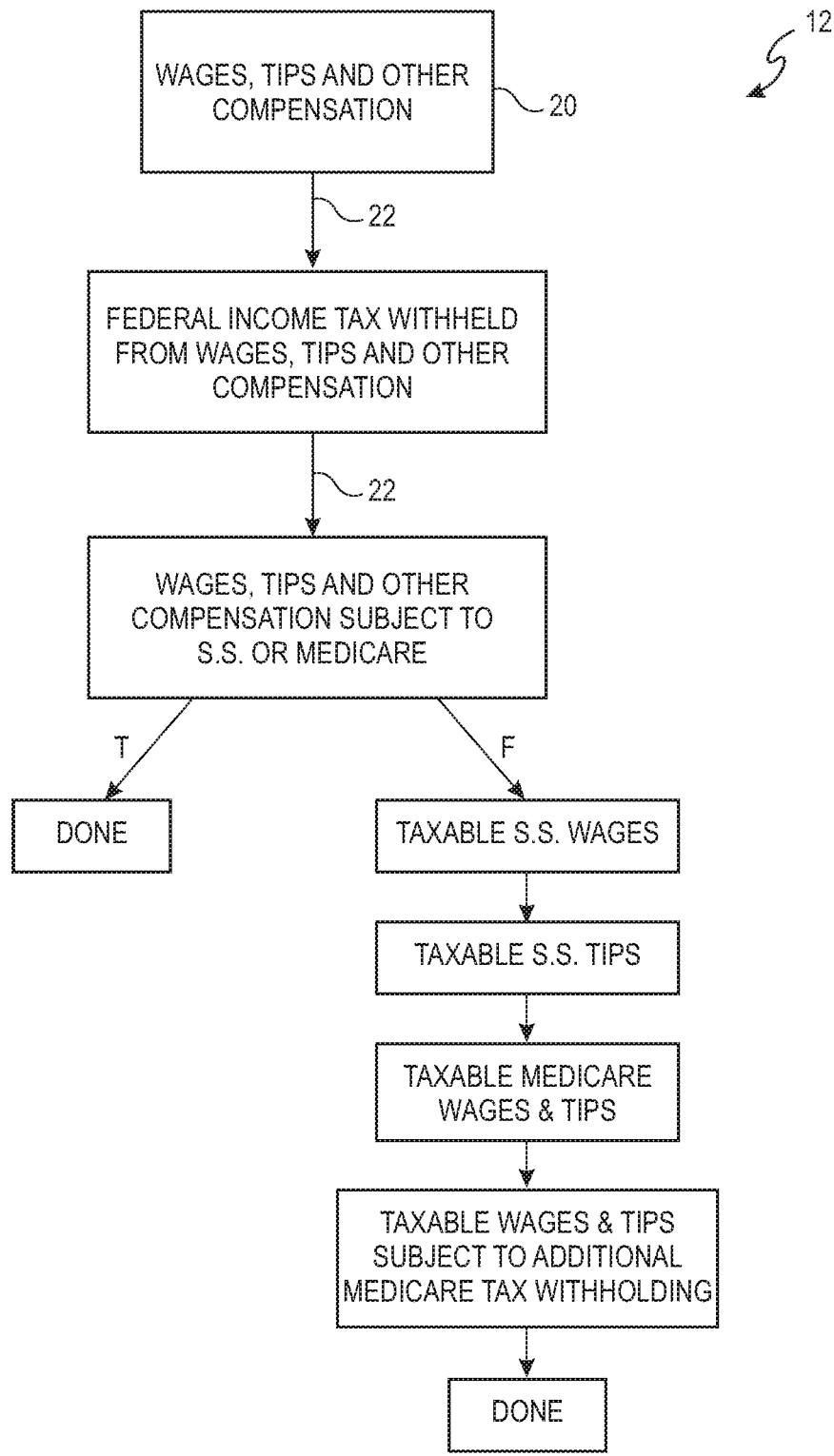
FIG. 3 illustrates an example of a simplified version of a completeness graph related to determining total taxes before adjustments on IRS Form 944, according to one embodiment.

The completeness graph 12 and the tax calculation graph 14 represent data structures that can be constructed in the form of tree. FIG. 3 illustrates an exemplary completeness graph 12 in the form of a tree with nodes 20 and arcs 22 representing a basic or general version of a completeness graph 12 for the topic of determining total taxes before adjustments for IRS Form 944. Each node 20 contains a tax data field or a condition that needs to be completed with data or an answer in order to complete the topic. The arcs 22 that connect each node 20 may illustrate the dependencies between nodes 20, or simply a flow of data requirements. The combination of arcs 22 in the completeness graph 12 illustrates the various pathways to completion. A single arc 22 or combination of arcs 22 that result in a determination of "Done" represent a pathway to completion. As seen in FIG. 3, there are several pathways to completion.

Figure 4:
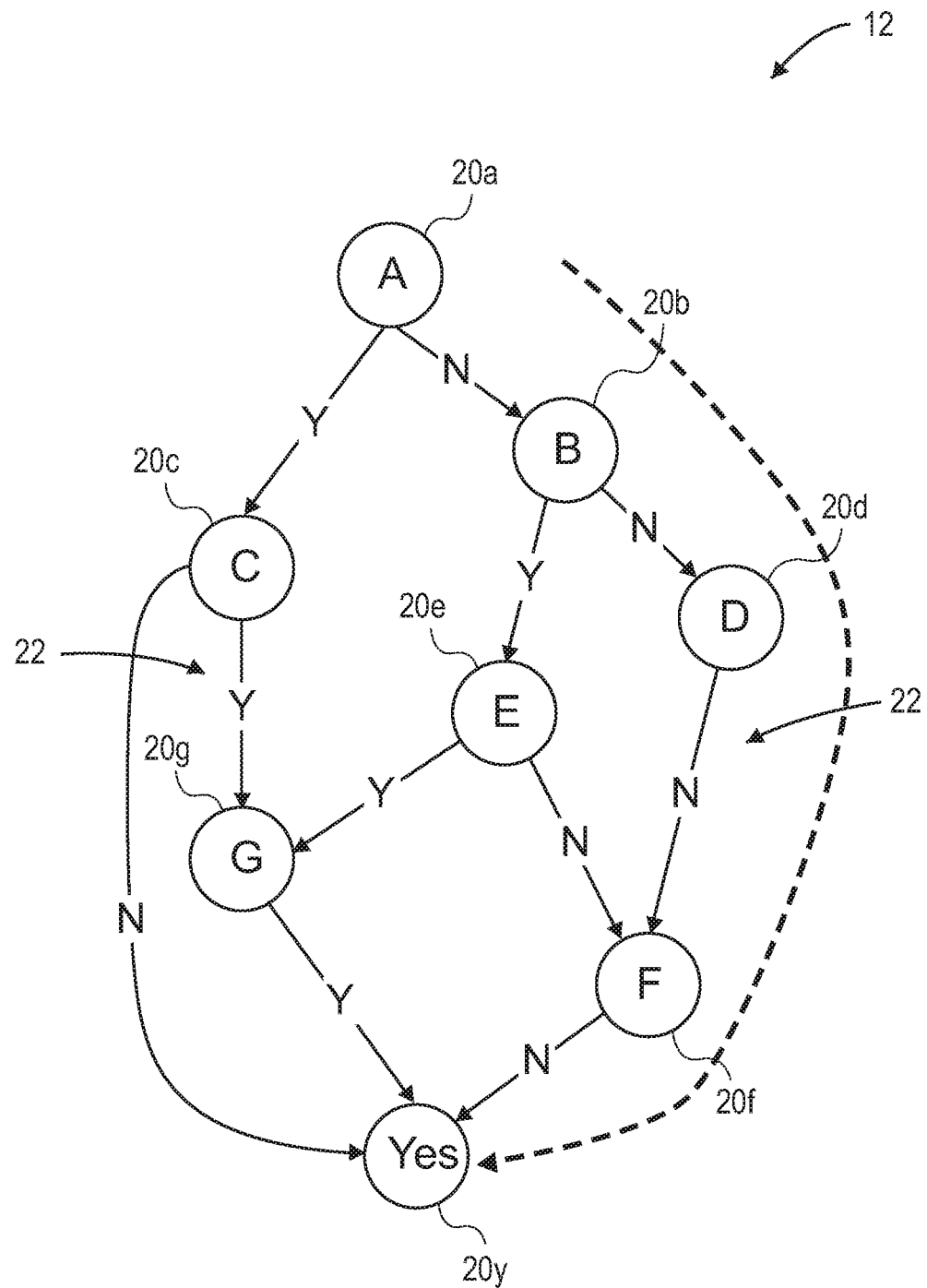
FIG. 4 illustrates another illustration of a completeness graph, according to one embodiment.

FIG. 4 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question for obtaining entity-specific compliance data. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 4 can be traversed through all possible paths from the start node 20a to the termination node 20y. By navigating various paths through the completion graph 12 in a recursive manner one can determine each path from the beginning node 20a to the termination node 20y. The completion graph 12 along with the pathways to completion through the graph can be converted into a different data structure or format. In the illustrated embodiment shown in FIG. 4, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 3) and answers derived from completion paths through the completion graph 12 and column 34h indicates a conclusion, determination, result or goal 34h concerning a compliance topic or situation, e.g., "Yes—wages tips and other compensation subject to Social Security or Medicare must be entered" or "No—no entries are required for wages tips and other compensation subject to social security or Medicare."

Referring to FIG. 5, each row 32 of the decision table 30 represents a compliance rule. The decision table 30, for example, may be associated with a federal payroll tax rule or a state payroll tax rule. In some instances, for example, a state tax rule may include the same decision table 30 as the federal tax rule. The decision table 30 can be used, as explained herein, to drive a personalized interview process for the user of compliance form preparation software 100, or to simply access the needed payroll tax data and answers from a data source, such as a financial accounting software application or database. In particular, the decision table 30 is used to select a question or questions to present to a user during an interview process, or to access a particular data field from a database. In this particular example, in the context of the completion graph 12 from FIG. 4 converted into the decision table 30 of FIG. 5, if the first question presented to the user during an interview process is question "A" and the user answers "Yes" rows 32c-e may be eliminated from consideration given that no pathway to completion is possible. The payroll tax rule associated with these columns cannot be satisfied given the input of "Yes" in question "A." Note that those cell entries denoted by "?" represent those answers to a particular question in a node that is irrelevant to the particular pathway to completion. Thus, for example, referring to row 34a, when an answer to $Q_A$ is "Y" and a path is completed through the completion graph 12 by answering Question C as "N" then answers to the other questions in Nodes B and D-F are "?" since they are not needed to be answered given that particular path.

After an initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions $Q_C$ and $Q_G$ in columns 34c, 34g, respectively. One of these questions is selected and the process repeats until either the goal 34h is reached or there is an empty candidate list.

FIG. 6 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data owned by Intuit, Inc. The statistical data 36 may be third party data that can be purchased or leased for use. For example, the statistical data 36 may be obtained from agency responsible for a particular compliance form or the like (e.g., IRS, state or local licensing agency, department of motor vehicles, etc.). In one aspect, the statistical data 36 does not necessarily relate specifically to the individual or individuals preparing the particular tax return. For example, the statistical data 36 may be obtained based on a number of tax filers which is then classified one or more classifications. For example, statistical data 36 can be organized with respect to age, entity status (e.g., joint, separate, married filing separately, corporation, individual, partnership, LLC, LLP, etc.), an entity's income range (gross income, adjusted gross income ("AGI"), etc.), an entity's geographic location, an entity's number of employees, and the like).

FIG. 6 illustrates two such columns 38a, 38b in the decision table 30 that contain statistical data 36 in the form of percentages. For example, column 38a (STAT1) may contain a percentage value that indicates employers having under a certain number of employees where $Rule_1$ is satisfied. Column 38b (STAT2) may contain a percentage value that indicates employers having over a certain number of employees where $Rule_1$ is satisfied. Any number of additional columns 38 could be added to the decision table 30 and the statistics do not have to relate to the number of employees. The statistical data 36 may be used, as explained in more detail below, by the payroll tax form preparation software 100 to determine which of the candidate questions ($Q_A$-$Q_G$) should be asked for a particular employer. The statistical data 36 may be compared to one or more known employer data fields (e.g., number of employees, filing status, geographic location, or the like) such that the question that is presented to the user is most likely to lead to a path to completion. Candidate questions may also be excluded or grouped together and then presented to the user to efficiently minimize compliance form interview questions during the data acquisition process. For example, questions that are likely to be answered in the negative can be grouped together and presented to the user in a grouping and asked in the negative—for example, "we think these questions do not apply to you, please confirm that this is correct." This enables the elimination of many pathways to completion that can optimize additional data requests of the taxpayer.

The completeness graph(s) 14 and/or decision table(s) 30 for a particular type of compliance form compose the completeness model for the respective type of compliance form.

Figure 7:
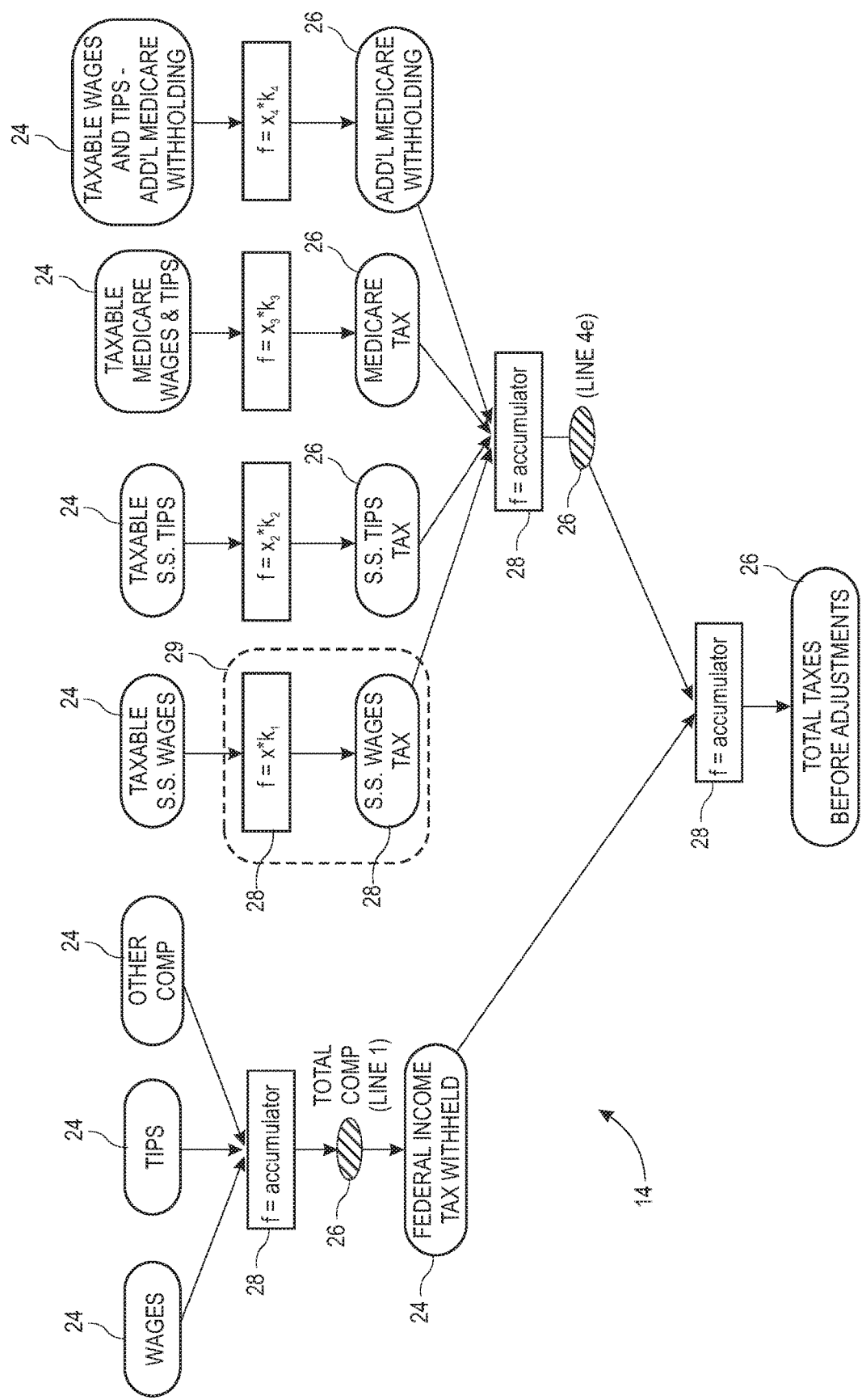
FIG. 7 illustrates an example of a payroll calculation graph according to one embodiment.

FIG. 7 illustrates one example of a payroll tax calculation graph 14 for a compliance form comprising a payroll tax form. The payroll calculation graph 14 semantically describes data dependent payroll tax operations that are used perform payroll calculation operations in accordance with the payroll tax rules 10. The payroll tax calculation graph 14 in FIG. 7 is a view of data dependent payroll tax operations that are used to determine the total taxes before adjustments, which is line 5 for IRS Form 944 for 2015. The payroll tax calculation graph 14 is a type of directed graph and, in most situations relevant to payroll calculations, is a directed acyclic graph that encodes the data dependencies amongst payroll concepts or topics.

In FIG. 7, various nodes 24 are leaf or input nodes. Examples of leaf nodes 24 in this particular example include data obtained from payroll data, such as from a financial accounting software application, like QUICKBOOKS, or other database of payroll data. Typically, though not exclusively, leaf nodes 24 are populated with data accessed from a payroll program or from user inputs. For user inputs, the user may enter the data via a user interface as described herein. In other embodiments, however, the leaf nodes 24 may be populated with information that is automatically obtained by the compliance form preparation software 100. For example, in some embodiments, compliance data documents may be imaged or scanned with relevant data being automatically extracted using Object Character Recognition (OCR) techniques. In other embodiments, prior compliance forms may be used by the compliance system 40 to extract information (e.g., employer name, address, EIN, etc.) which can then be used to populate the leaf nodes 24. Online resources such as financial services websites or other websites can be crawled and scanned to scrape or otherwise download compliance form data that can be automatically populated into leaf nodes 24. In still other embodiments, values for leaf nodes 24 may be derived or otherwise calculated.

Still other internal nodes referred to as functional nodes 26 semantically represent a compliance form concept, such as a compliance form line item, such as a form field, and may be calculated or otherwise determined using a function node 28 (also referred to as a "function 28"). The functional node 26 and the associated function 28 define a particular tax operation 29. For example, as seen in FIG. 7, operation 29 refers to tax due for social security wages and is the result of the multiplication function 28 which multiplies the social security wages ($X_1$) from leaf node 24 times a tax rate constant ($K_1$). The functional node 26 may include a number in some instances. In other instances, the functional node 26 may include a response to a Boolean expression such as "true" or "false." The functional nodes 26 may also be constant values in some instances. Some or all of these functional nodes 26 may be labeled as "compliance concepts" or "compliance topics." The combination of a functional node 26 and its associated function 28 relate to a specific compliance form operation (in this example, a payroll tax operation) as part of the compliance topic (in this example, a payroll tax topic).

Interconnected function nodes 26 containing data dependent compliance concepts or topics are associated with a discrete set of functions 28 that are used to capture domain specific patterns and semantic abstractions used in the payroll tax calculation. The discrete set of functions 28 that are associated with any particular function node 26 are commonly re-occurring operations for functions that are used throughout the process of calculating a particular compliance form. For example, examples of such commonly re-occurring functions 28 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In some embodiments, the function 28 may also include any number of mathematical or other operations. Examples of functions 28 include summation, subtraction, multiplication, division, and comparisons, greater of, lesser of, at least one of, calling of look-ups of tables or values from a database or library. It should be understood that the function nodes 26 in the calculation graph 14 may be shared in some instances.

Figure 8:
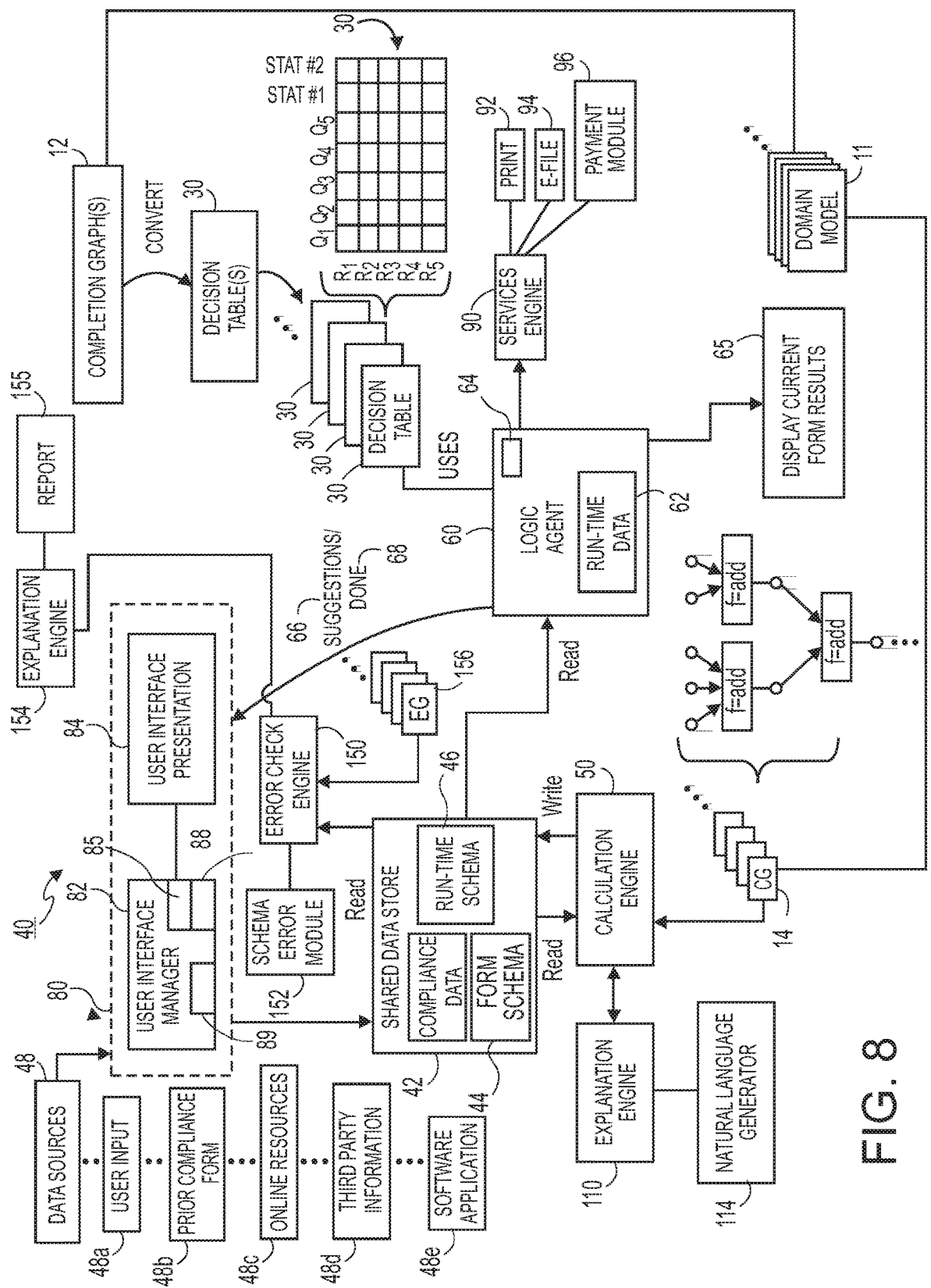
FIG. 8 schematically illustrates a compliance system for calculating a compliance form using rules and calculations based on calculation graphs and identifying errors using a schema error module and/or error graphs, according to one embodiment.

FIG. 8 schematically illustrates a compliance system 40 for preparing and/or submitting a plurality of types of compliance forms using rules and calculations based on a declarative data structures, according to one embodiment. The system 40 includes a shared data store 42 that contains therein, for each of the types of compliance forms, a schema 44 or canonical model representative of compliance data fields (typically, fields for the input data values for preparing a compliance form) and the calculated compliance data fields (the fields for the compliance data calculated using the compliance data) utilized or otherwise required to complete each type of compliance form. The shared data store 42 may be a repository, file, or database that is used to contain the compliance data fields. The shared data store 42 is accessible by a computing device 102, 103 as described herein (e.g., FIG. 12). The shared data store 42 may be located on the computing device 102, 103 running the compliance program 100 or it may be located remotely, for example, in a cloud environment on another, remotely located computer. The schema 44 may include, for example, a schema based on the requirements of the responsible agency, such as the Modernized e-File (MeF) system developed by the Internal Revenue Service. MeF uses extensible markup language (XML) format that is used when identifying, storing, and transmitting data. For example, each line or data element on a payroll tax form is given an XML name tag as well as every instance of supporting data. The compliance program 100 may use XML schemas and business rules to electronically prepare and transmit a completed compliance form to the responsible agency. The responsible agency may then validate the transmitted file for the compliance form against the schemas and business rules in the schema 44.

As seen in FIG. 8, the shared data store 42 may import data from one or more data sources 48. A number of data sources 48 may be used to import or otherwise transfer compliance form related data to the shared data store 42. This may occur through a user interface manager 80 as described herein or, alternatively, data importation may occur directly to the shared data store 42 (not illustrated in FIG. 8). The compliance form related data may include employer identification data such as a name, address, and taxpayer ID (EIN).

For some compliance forms, such as tax related compliance forms like payroll tax forms, compliance data (e.g., employer payroll tax data), may be accessed from a financial accounting application 48e The financial accounting system 48e may be any suitable financial accounting application, such as QUICKBOOKS, available from Intuit Inc. of Mountain View, Calif. The compliance data may be electronically transferred to the compliance system 40 via the user interface manager 80, or directly to the shared data store 42, as described above.

User input 48a is also one type of data source 48. User input 48a may take a number of different forms. For example, user input 48a may be generated by a user using, for example, an input device such as a keyboard, mouse, touchscreen display, voice input (e.g., voice to text feature), photograph or image, or the like to enter information manually into the payroll tax form preparation software 100. For example, as illustrated in FIG. 8, user interface manager 82 contains an import module 89 that may be used to select what data sources 48 are automatically searched for payroll tax related data. Import module 89 may be used as a permission manager that includes, for example, user account numbers and related passwords. The UI control 80 enables what sources 48 of data are searched or otherwise analyzed for compliance form related data. For example, a user may select prior compliance form 48b to be searched but not online resources 48c. The compliance data may flow through the UI control 80 directly as illustrated in FIG. 8 or, alternatively, the compliance data may be routed directly to the shared data store 42. The import module 89 may also present prompts or questions to the user via a user interface presentation 84 generated by the user interface manager 82. For example, a question or prompt may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the data sources 48.

User input 48a may also include some form of automatic data gathering. For example, a user may scan or take a photographic image of a document (e.g., a prior IRS Form 944, W-2, driver's license, vehicle registration, identification, business license, etc.) that is then processed by the compliance program 100 to extract relevant data fields that are then automatically transferred and stored within the data store 42. OCR techniques along with pre-stored templates of common compliance form related documents may be called upon to extract relevant data from the scanned or photographic images whereupon the data is then transferred to the shared data store 42.

Another example of a data source 48 is a prior compliance form 48b. In other words, a prior compliance form 48b is a compliance form of the type currently being prepared by the compliance system 40 that was previously prepared by the same entity or even a different entity. A prior compliance form 48b that is stored electronically can be searched and data is copied and transferred to the shared data store 42. The prior compliance form 48b may be in a proprietary format (e.g., .txf, .pdf) or an open source format. The prior compliance form 48b may also be in a paper or hardcopy format that can be scanned or imaged whereby data is extracted and transferred to the shared data store 42. In another embodiment, a prior compliance form 48b may be obtained by accessing a responsible agency database (e.g., IRS records, DMV records, licensing agency records, etc.).

An additional example of a data source 48 is an online resource 48c. An online resource 48c may include, for example, websites for the entity for which a compliance form is being prepared, or websites known to have entity specific compliance data related to particular types of compliance forms. For example, financial service providers such as banks, credit unions, brokerages, investment advisors typically provide online access for their customers to view holdings, balances, transactions.

Still referring to FIG. 8, another data source 48 includes sources of third party information 48d that may be accessed and retrieved. For example, other responsible agencies may have compliance data useful in preparing one or more of the compliance forms.

Figure 12:
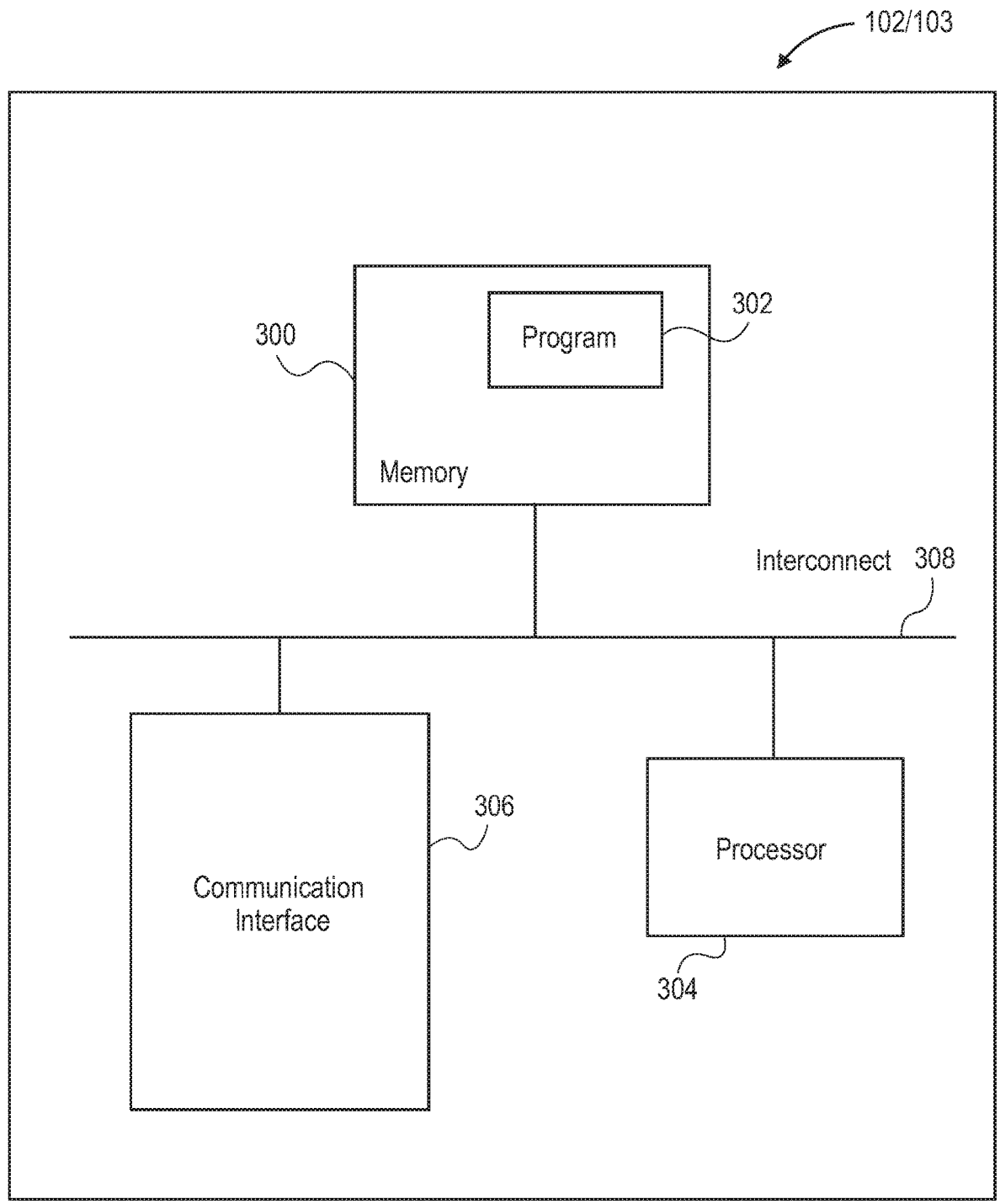
FIG. 12 illustrates generally the components of a computing device that may be utilized to execute the software for automatically calculating or determining tax liability and preparing a tax return based thereon.

Referring briefly to FIG. 12, the compliance program 100 including the system 40 of FIG. 8 is executed by the computing device 102, 103. Referring back to FIG. 8, the payroll tax form preparation software 100 includes a calculation engine 50 that performs one or more payroll calculations or operations based on the available compliance data at any given instance within the schema 44 in the shared data store 42. For example, for a payroll tax form, the calculation engine 50 may calculate the total balance due from the employer, the total taxes before adjustments, the current year's adjustments, the total deposits for the year, overpayment amount, or one or more intermediary calculations. The calculation engine 50 utilizes the one or more calculation graphs 14 as described previously in the context of FIGS. 2 and 7. The tax calculation engine 50 reads the most current or up to date entity-specific compliance data contained within the shared data store 42 for the compliance form currently being processed and then performs compliance form calculations based on the respective calculation graph 14 of the domain model 11 for the selected compliance form. Updated calculation values are then written back to the shared data store 42. As the updated calculation values are written back, new instances 46 of the compliance form schema 46 are created.

Still referring to FIG. 8, the system 40 may also include a logic agent (LA) 60. The LA 60 operates in conjunction with the shared data store 42 whereby updated compliance data represented by instances 46 are read to the LA 60. The LA 60 contains run time data 62 that is read from the shared data store 42. The run time data 62 represents the instantiated representation of the canonical compliance schema 44 at runtime. The LA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form a Drools expert engine. Other declarative rules engines 64 may be utilized and a Drools expert rule engine 64 is provided as one example of how embodiments may be implemented. The LA 60 may be implemented as a dedicated module contained within the payroll tax form preparation software 100.

As seen in FIG. 8, The LA 60 uses the decision tables 30 (which are part of the compliance model) to analyze the run time data 62 and determine whether a compliance form is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI control 80. If the rule engine 64 does not output a "done" instruction 68 that means there are one or more topics or sub-topics that are not complete, which, as explained in more detail below presents interview questions to a user for answer. The LA 60 identifies a decision table 30 corresponding to one of the non-complete topics or sub-topics and, using the rule engine 64, identifies one or more non-binding suggestions 66 to present to the UI control 80. The non-binding suggestions 66 may include a listing of compilation of one or more questions (e.g., $Q_1$-$Q_5$ as seen in FIG. 8) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 6 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher.

The following pseudo code generally expresses how a rule engine 64 functions utilizing a fact cache based on the runtime schema data 62 or the instantiated representation of the schema data 46 at runtime and generating non-binding suggestions 66 provided as an input to UI control 80:

Rule engine (64)/Logic Agent (LA) (60)
   // initialization process
   Load_Compliance_Knowledge_Base;
   Create_Fact_Cache; While (new_data_from_application)
   Insert_data_into_fact_cache;
      collection=Execute_Compliance_Rules; // collection is
         all the fired rules and corresponding conditions
      suggestions=Generate_suggestions (collection);
   send_to_application (suggestions);

Still referring to FIG. 8, the UI controller 80 encompasses a user interface manager 82 and a user interface presentation or user interface 84. The user interface presentation 84 is controlled by the interface manager 82 and may manifest itself, typically, on a visual screen or display 104 that is presented on a computing device 102, 103 (seen, for example, in FIG. 12). The UI controller 80 utilizes the user interface assets 19 for the particular domain model 11 being processed at the time. The user interface assets 19 for each domain model 11 may include one or more of the following components which are configured specifically for the compliance form of the respective domain model 11: configuration files; a user interface presentation 84 (which may include interview screens and/or data input forms, as described below); and/or a suggestion resolution element, as described in more detail below. The computing device 102 may include the display of a computer, laptop, tablet, mobile phone (e.g., Smartphone), or the like. Different user interface presentations 84 may be invoked using a UI generator 85 depending, for example, on the type of display 104 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84.

The user interface manager 82, as explained previously, receives non-binding suggestions from the LA 60. The non-binding suggestions may include a single question or multiple questions that are suggested to be displayed to the taxpayer via the user interface presentation 84. The user interface manager 82, in one aspect of the invention, contains a suggestion resolution element 88, is responsible for resolving of how to respond to the incoming non-binding suggestions 66. For this purpose, the suggestion resolution element 88 may be programmed or configured internally. Alternatively, the suggestion resolution element 88 may access external interaction configuration files.

The configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may be include preprogrammed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on-the-fly during runtime.

Alternatively, the user interface presentation 84 may comprise a "forms mode" which presents fillable form fields for the user to enter the entity-specific compliance data required for preparing the compliance form. The forms mode may present the fillable form fields within a representation of the compliance form being prepared, or in any other suitable presentation. The user interface manager 82 may highlight or otherwise emphasize the fillable form fields based on the suggestions 66 from the LA 60, such as by numbering the fillable form fields based upon the order or sequence of the suggestions 66 from the LA 60.

As seen in FIG. 8, the UI controller 80 interfaces with the shared data store 42 such that compliance data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the compliance program 100 using an input device that is associated with the computing device 102, 103. For example, a user may use a mouse, finger tap, keyboard, stylus, voice entry, or the like to respond to questions. The user may also be asked not only to respond to questions but also to include dollar amounts, check or un-check boxes, select one or more options from a pull down menu, select radio buttons, or the like. Free form text entry may also be requested of the user.

Still referring to FIG. 8, in one aspect, the LA 60 may output a current compliance form result 65 which can be reflected on a display 104 of a computing device 102, 103. For example, the current compliance form result 65 may illustrate a payment due or other actions that must be taken by the user. The current compliance form results 65 may also illustrate various other intermediate calculations or operations used to calculate the compliance form.

The LA 60 may also output completed compliance form data that is used to generate the actual completed compliance form (either electronic compliance form or printed paper compliance form). The compliance form itself can be prepared by the LA 60 or at the direction of the LA 60 using, for example, the services engine 90 that is configured to perform a number of tasks or services for the system provider. The LA 60 or the services engine 90 utilizes the filing schema and/or printing templates 17 for the particular domain model 11 being processed at the time. The filing schema and/or printing templates 17 for each domain model 11 are specifically configured for the respective compliance form for each domain model 11.

For example, the services engine 90 can include a printing option 92. The printing option 92 may be used to print a copy of a compliance form, compliance data and calculated compliance data, summaries of such data, error reports 155 (as described below), and the like. The services engine 90 may also electronically file 94 or e-file a compliance form with the responsible agency. Whether a paper or electronic compliance form is filed, data from the shared data store 42 required for particular compliance forms, is transferred over into the desired format. With respect to electronically filed compliance forms, the compliance form may be filed using the particular schema required by the responsible agency, such as the MeF web-based system of the IRS that allows electronic filing of payroll tax forms via the Internet. Of course, other e-filing systems may also be used other than those that rely on the MeF standard.

The compliance system 40 also has a payment module 98 which may be integrated with the services engine 90, as shown in FIG. 7, or alternatively, it may be a separate module of the compliance system 50. The payment module 90 is configured to process the payment of fees which are associated with the submission of a compliance form. For instance, a compliance form may require an application fee and/or payment of a fee as determined and/or calculated in the preparation of the compliance form, such as a tax, license fee, etc. The payment module 90 is configured to process a variety of payment modes, such as automated clearing house payments ("ACH"), electronic bank transfers, credit card payments, payments via online payment systems (e.g., PAY-PAL™) and/or other suitable electronic payment modes. The payment module 90 may open a frame within a web browser or user interface screen and connect to a payment website, such as a credit card payment website, or payment website, or the payment module 90 may be configured to display a payment screen in which the user can select payment types and then enter payment details, such as payee name, payment credit card or bank account number, payee address, user name and password for a payment system, etc.

The payment module 98 is also be configured to obtain payment from user for use of the compliance system 40 to prepare and/or submit a compliance form. The payment module 98 may obtain payment using any of the means described above for processing a payment for fees associated with a compliance form.

Referring again to FIG. 8, the system 40 includes an explanation engine 110 that operates within the compliance program 100 to generate a narrative explanation from one or more explanations associated with a particular tax operation 29 (illustrated in FIGS. 6A and 6B). Each of the nodes 26, 28 and 29 of the calculation graph 14 are associated with an explanation related to the particular node, such as an explanation of the result of the node. For example, to generate the narrative explanation for a particular tax operation 29, the explanation engine 110 extracts the stored function 28 that is associated with the particular functional node 26. The stored function 28 is one function of a defined set and may be associated with a brief explanation. For example, a "cap" function may be associated with an explanation of "value exceeds cap." This brief explanation can be combined with a stored explanation or narrative that is associated with the particular functional node 26 within the calculation graph 14. For example, the functional node 26 paired with the stored "cap" function 28 gives a contextual tax explanation that is more than merely "value exceeds cap." For instance, a pre-stored narrative associated with the particular functional node 26 having to do with a child tax credit within a calculation graph 14 may be a complete statement or sentence such as "You cannot claim a child tax credit because your income is too high." In other embodiments, the pre-stored narrative may be only a few words or a sentence fragment. In the above example, the pre-stored narrative may be "credit subject to income phase out" or "AGI too high." A particular functional node 26 and associated function 28 may have multiple pre-stored narratives. The particular narrative(s) that is/are associated with a particular functional node 26 and associated function 28 may be stored in entries 112 in a data store or database such as data store 42 of FIG. 8. For example, with reference to FIG. 8, data store 42 contains the pre-stored narratives that may be mapped or otherwise tagged to particular functional nodes 26 and associated functions 28 contained within a particular calculation graph 14. The locations or addresses of the various functional nodes 26 and the associated functions 28 can be obtained using the calculation graphs 14.

The pre-stored narratives for each type of compliance form may be embodied in a respective narratives module for each type of compliance form. Each narrative module may then be a component of the domain model 11 for the respective type of compliance form. Thus, the explanation engine 110 utilizes the narratives module for the particular domain model 11 being processed at the time. These stored entries 112 can be recalled or extracted by the explanation engine 110 and then displayed to a user on a display 104 of a computing device 102, 103. For example, explanation engine 110 may interface with the UI control 80 in two-way communication such that a user may ask the compliance program 100 why a particular compliance calculation, operation, or decision has been made by the compliance system 40. For instance, the user may be presented with an on-screen link, button, or the like that can be selected by the user to explain to the user why a particular compliance calculation, operation, or decision was made by the compliance program 100. For example, in the context the Affordable Care Act ("ACA") penalty calculation of an income tax return, a user may see an ACA penalty of $1,210.00 listed on the screen of the computing device 102, 103 while he or she is preparing the tax return for a prior year. The user may be interested in why there is such a penalty. As one example, the initial explanation provided to the user may be "you have an ACA penalty because you, your spouse, and your two child dependents did not have coverage during the 2014 calendar year and the penalty is based on your income." This explanation may be associated with, for example, a function node 26 and functional node 28.

In some instances, a user is able to further "drill down" with additional questions to gain additional explanatory detail. This additional level of detailed explanations is possible by traversing the calculation graph 14 to identify each of the preceding or upstream input node(s) 24, function node(s) 26 and/or function node(s) 28. In the context of the ACA example discussed above, a user may not be satisfied with the initial explanation described above, and may want additional explanation. In this instance, for example, the word "income" may be highlighted or linked with a hyperlink. A user clicking on this would then be provided with additional explanation on the detail regarding the ACA penalty. In this example, the user may be provided with "Under the ACA your penalty is the greater of 1 of your taxable income or a fixed dollar amount based on your family circumstances. In your situation, the 1% of taxable income exceeded the fixed dollar amount." This particular explanation may be associated with the predecessor function node 26 and function 28.

With reference to FIG. 8, the explanation engine 110 may also automatically generate explanations that are then communicated to the user interface manager 82. The automatically generated explanations may be displayed on a display associated with the computing devices 102, 103. In some embodiments, the explanations may be contemporaneously displayed alongside other tax data and/or calculations. For example, as a user inputs his or her information into the compliance program 100 and calculations are automatically updated, explanations may be automatically displayed to the user. These explanations may be displayed in a side bar, window, panel, pop-up (e.g., mouse over), or the like that can be followed by the user. The explanations may also be fully or partially hidden from the user which can be selectively turned on or off as requested by the user.

In one aspect of the invention, the choice of what particular explanation will be displayed to a user may vary. For example, different explanations associated with the same function node 26 and function 28 may be selected by the explanation engine 110 for display to a user based on the user's experience level. A basic user may be given a general or summary explanation while a user with more sophistication may be given a more detailed explanation. A professional user such as a CPA or other tax specialist may be given even more detailed explanations.

In some embodiments, the different levels of explanation may be tied to product types or codes. These may be associated with, for example, SKU product codes. For example, a free edition of the compliance program 100 may provide few or no explanations. In a more advanced edition (e.g., "Deluxe edition"), additional explanation is provided. Still more explanation may be provided in the more advanced editions of the compliance program 100 (e.g., "Premier edition"). Versions of the compliance program 100 that are developed for accountants and CPAs may provide even more explanation.

In still other embodiments a user may be able to "unlock" additional or more detailed explanations by upgrading to a higher edition of compliance program 100. Alternatively, a user may unlock additional or more detailed explanations in an a la carte manner for payment of an additional fee. Such a fee can be paid through the compliance program 100 itself using known methods of payment.

The explanation engine 110 may also include a natural language generator 114 that converts fragments, expressions or partial declaratory statements into natural language expressions that are better understood by users. The natural language expressions may or may not be complete sentences but they provide additional contextual language to the more formulaic, raw explanations that may be tied directly to the explanation associated with a function node 26 and associated function 28. For instance, the explanation engine 110 may extract a brief explanation which indicates that the child credit tax is zero due to phase out from income level and then use the national language generator 114 to convert the brief explanation into a more understandable sentence that can be presented to the user. In one aspect of the invention, the natural language generator 114 may rely on artificial intelligence or machine learning such that results may be improved.

Still referring to FIG. 8, the payroll system 40 may also include an error check engine 150 and a schema error module 152 for identifying errors in the preparation of a compliance form using the compliance system 40. The error check engine 150 utilizes the error rules 15 for the particular domain model 11 being processed at the time. The error rules 15 for each domain model 11 may include one or more of the following components which are specifically configured for the compliance form of the respective domain model 11: a schema error module; and/or error graphs, as described in more detail below.

The schema error module 152 includes a plurality of error rules wherein each error rule is associated with a particular compliance form field or a compliance form data field. Each error rule comprises meta data which is configured to be usable by the error check engine 150 to check a data value for a respective data field and determine whether it conforms to the schema requirements for the particular compliance form being prepared as set forth in the compliance rules and regulations 10, which includes schema requirements. The error check engine 150 is configured to read/access the entity-specific compliance data from the shared data store 44 and check such data against the error rules for the respective data fields to identify one or more errors in the preparation of the compliance form. For instance, the error rules may include meta data configured to check for errors in the formatting of the compliance data in respective compliance data fields. As several examples, an error rule may check that the value for an EIN is only numbers and 9 digits; an error rule may check that the wages, tips and other compensation is only a positive number, an error rule may check that the ZIP code includes only 5 numbers or 9 numbers, an error rule may check that the state includes a valid two letter state code, etc. If the error check engine 150 determines that a data value does not conform to the requirements of the error rule, then the error check engine 150 flags the error and creates an error record which identifies the error.

In order to provide a more human understandable explanation of errors according to the error rules, each of the error rules may also have a schema error explanation associated with the error rule. The schema error explanation may include a narrative explanation, fragments, expressions, and/or partial statements. The error check engine 150 is further configured to utilize the schema error explanation to generate a narrative explanation of errors identified according to a particular error rule. For instance, a schema error explanation associated with an error rule for checking the format of an EIN may be a complete sentence such as "The EIN must include only numbers and 9 digits." The schema error explanation may be a template having fillable fields and the error check engine 150 may be configured to provide the explanation as well as providing a description of the specific erroneous input, such as "The EIN must include only numbers and 9 digits, and the value provided is _____-_____" wherein the error check engine 150 is configured to fill in the blanks with actual value input to the payroll system 40. The error explanation may also include a recommendation or requirement for correcting the error. In the EIN example, the recommendation may state something like, "You must enter 9 numbers, and no other characters."

The errors identified by the error check engine 150 and the explanations generated by the error check engine 150 may be compiled into a report 155 for use by a user, such as an agent of a service provider utilizing the compliance system 40 to prepare compliance forms as a service. The report 155 may be as simple as a log file, or it may be an email, or an electronic document like a pdf or Microsoft Word file. The report 155 could also be a web page configured for display on a web browser and made accessible via the internet. The error check engine 150 may also transmit the errors to the UI controller 80 which can then display the errors to a user, and/or utilize the errors in the process of data entry via the UI manager 82.

The error check engine 150 can identify errors on a field level or entry level as the data is being accessed and/or input into the compliance system 40. Thus, it does not have to be executed on an entire compliance form. Moreover, the error check engine 150 can check for errors using the error rules in the schema error module 152 as the data is being input, such as being typed in by a user. In such case, the error check engine 150 and/or UI manager 82 can be configured to block entry of invalid data or display an error message when a user attempts to enter data which does not conform to the applicable error rule.

Still referring to FIG. 8, instead of the error check engine 150 generating explanations, the compliance system 40 may have a separate explanation engine 154 which is configured to receive the errors identified by the error check engine 150 and then generate error explanations and/or an error report 155, same or similar to those described above. The explanation engine 154 can also transmit the error explanations to the UI controller 80 which can then display the explanations to a user, and/or utilize the errors in the process of data entry via the UI manager 82. The explanation engine 154 may be configured to utilize the narrative explanation, fragments, expressions, and/or partial statements of the error explanations to generate natural language expressions that are more easily understood by a user. The natural language expressions may or may not be complete sentences but they provide additional contextual language to the more formulaic, raw explanations that may be tied directly to the explanation associated with a function node 26 and associated function 28.

Figure 9:
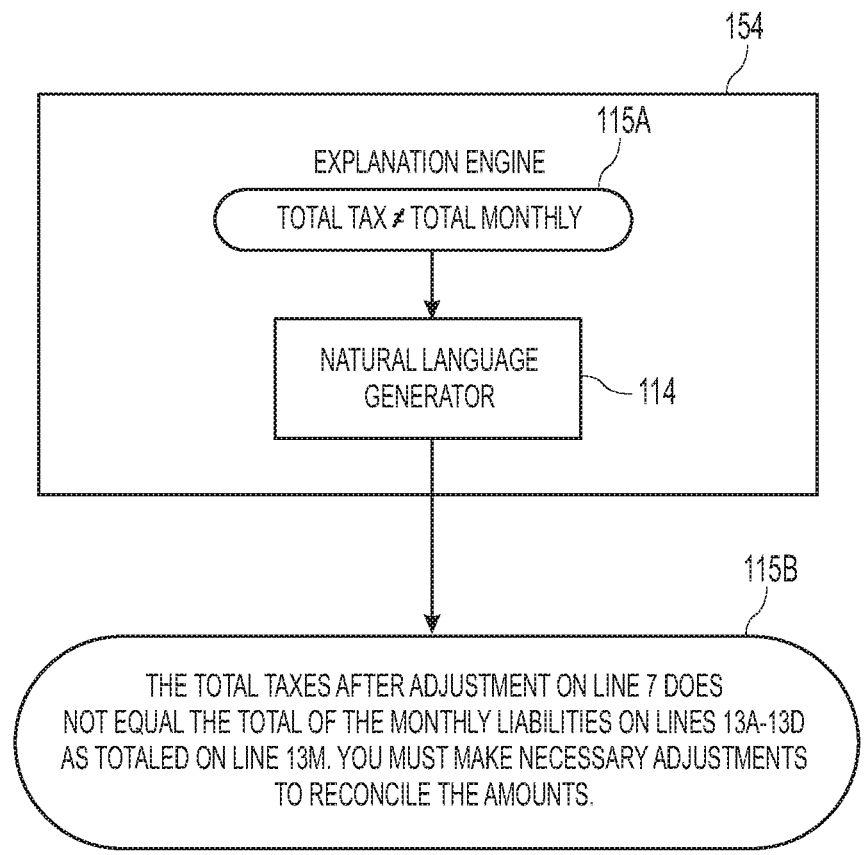
FIG. 9 illustrates an explanation engine for generating error explanations, according to one embodiment.

FIG. 9 illustrates additional details of the explanation engine 154, according to one embodiment of the invention. In the example of FIG. 9, a brief explanation 115A extracted by the explanation engine 110 indicates that the total tax after adjustments does not equal the total monthly tax liabilities. In this example, the user is also provided with a natural language explanation 1156 that is more readily understood by users which is generated by a natural language generator 114. The natural language generator 114 may utilize artificial intelligence or machine learning such that results may be improved.

The explanation engine 154 may also be configured to generate additional, more detailed narrative explanations in response to user prompts. For instance, each of the error rules may be associated with a respective error explanation, or plurality of error explanations such that a single error rule has multiple error explanations, such as a general explanation and additional more detailed explanations. The explanation engine 154 may display the general explanation along with user prompts (e.g., selection buttons, hyperlinks, etc. may be used to allow the user to select them) which the user can select in order to view additional more detailed explanations. This allows a user to drill down on an error to view more detailed explanations.

In another optional feature for identifying errors and generating error explanations, the payroll system 40 may be configured to utilize the declarative-data structure construct in the form of error graphs 156 to identify more complex errors than the schema errors checked using the schema error module 152. For instance, error graphs 156 may be utilized by the error check engine 150 to identify errors involving multiple data fields, and multiple logic expressions and functions. Similar to the calculation graphs 14 discussed above, the error graphs 156 comprise a plurality of interconnected nodes, including leaf or input nodes 24, functional nodes 26 and/or functions 28.

FIGS. 10A-10F illustrate a number of examples of error graphs 156 for identifying errors in the preparation of a compliance form. Similar to the calculation graphs 14 described above, the error graphs 156 include leaf or input nodes 24 the values of which are accessed from the shared data store, such as compliance data values and calculated payroll data values. The error graphs 156 also include functional nodes 26 which represent a compliance form concept, or result from a function 28, such as a mathematical function or a logical expression. The functional node 26 may include a number or value in some instances, or a response to a logical function such as a Boolean expression like "true" or "false", in other instances.

Figure 10A:
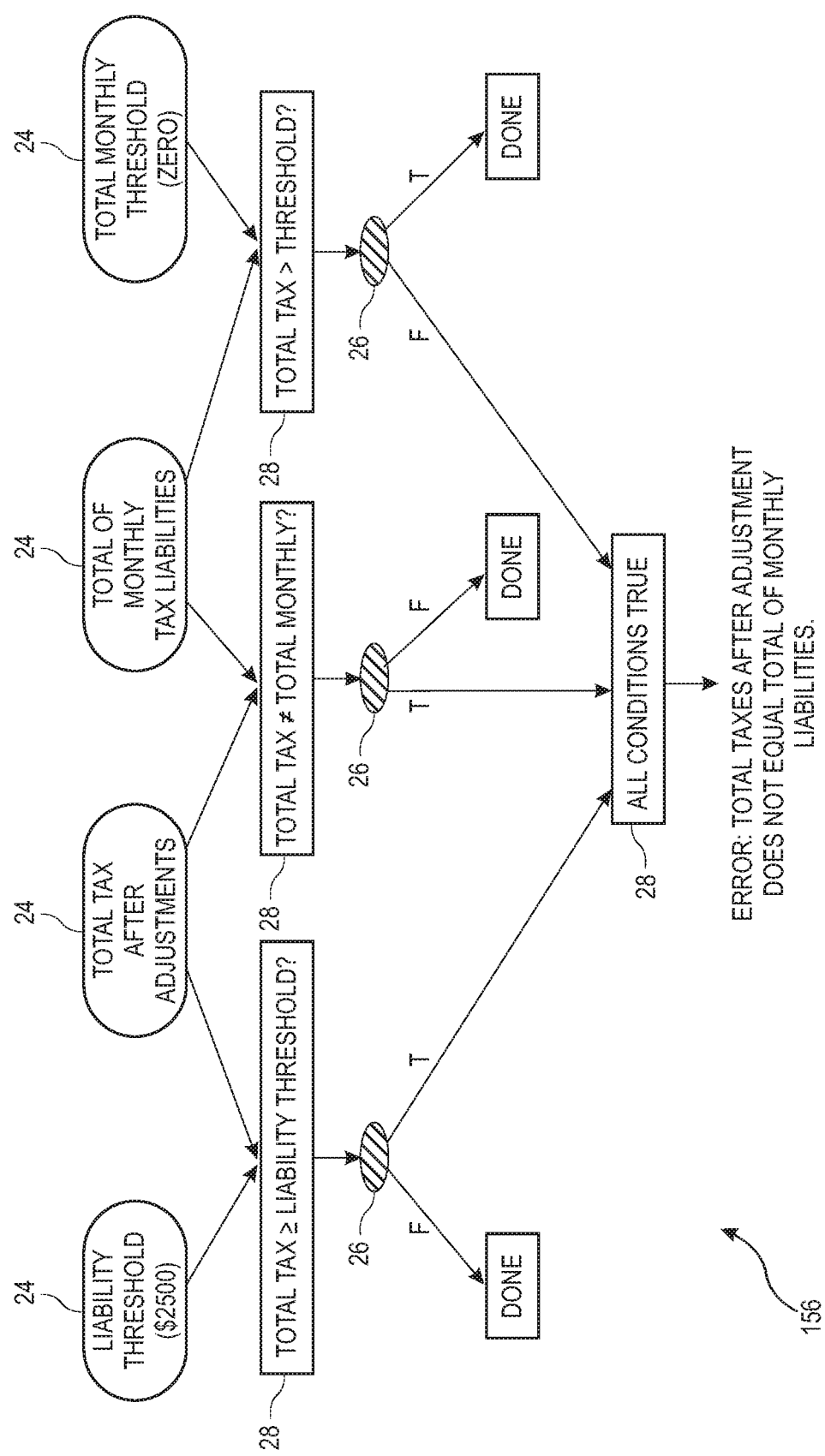
FIG. 10A illustrates an example of an error graph for identifying an error regarding a mismatch between total tax after adjustment and total of monthly tax liability, according to one embodiment.

For instance, FIG. 10A is an example of an error graph 156 for identifying an error regarding the total tax after adjustment not being equal to the total of the monthly tax liability in preparing IRS Form 944 for 2015. The error graph 156 includes input nodes 24, including certain constants consisting of thresholds, and calculated payroll data, like the total tax after adjustments and the total of the monthly tax liabilities. The error graph 156 also includes function nodes 28 having Boolean logical operators for comparing certain values, and functional nodes 26 representing the results of the logical operators. The "DONE" result for a functional node 26 indicates that there is no error for the based on that particular calculation path of the error graph 156.

Figure 10B:
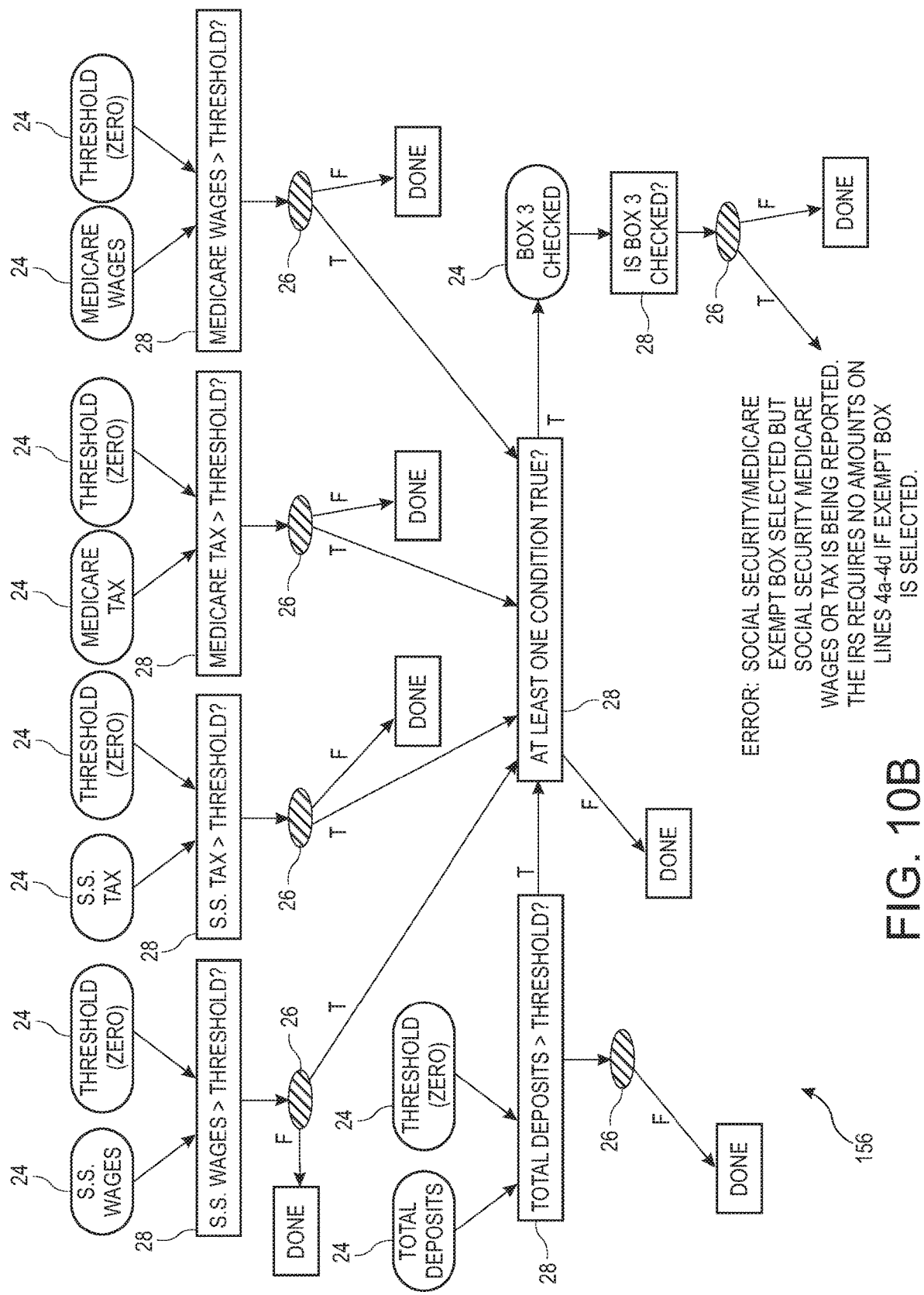
FIG. 10B illustrates an example of an error graph for identifying an error regarding a mismatch between social security/medicare exempt box selected and social security/medicare wages reported, according to one embodiment.
Figure 10C:
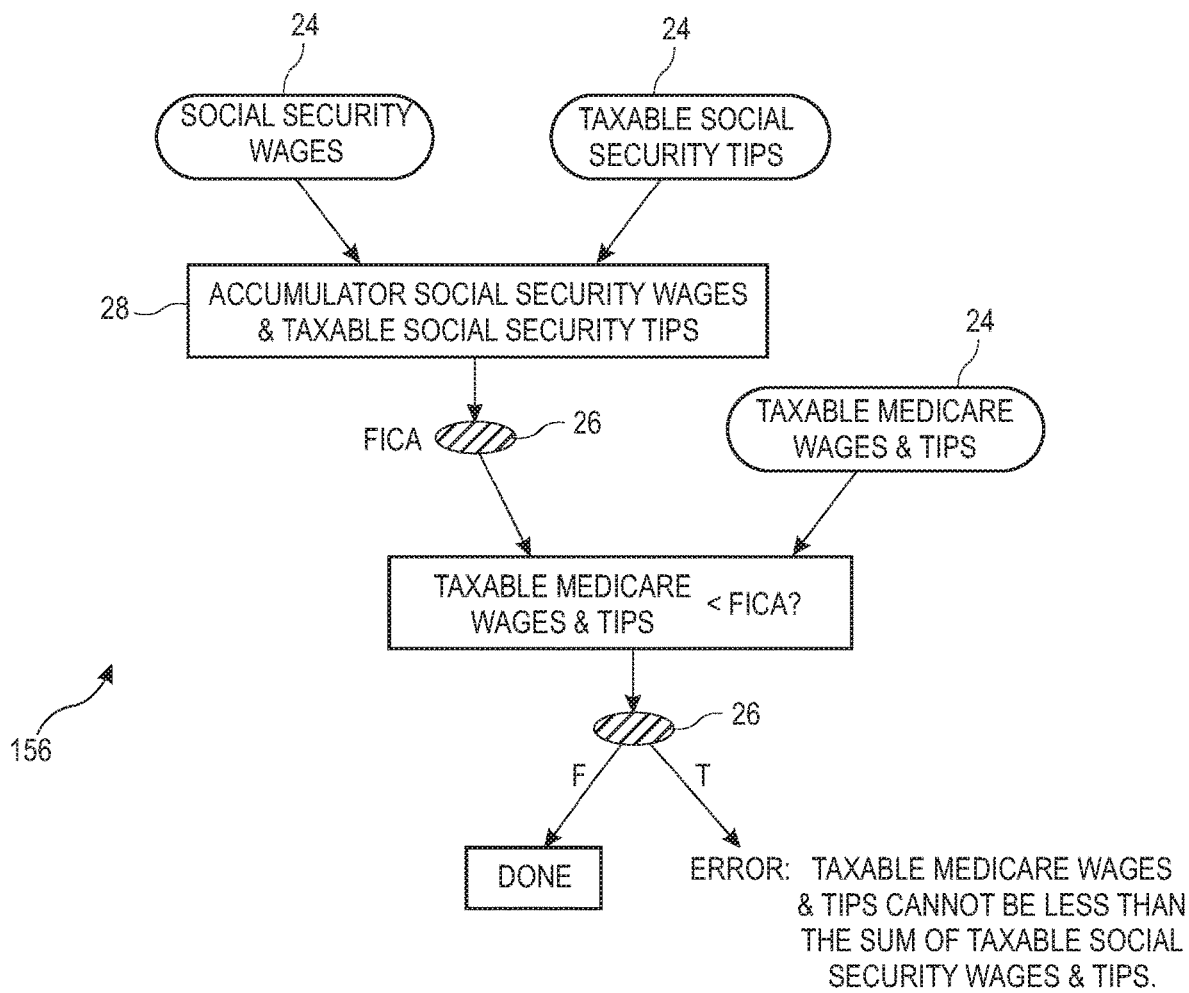
FIG. 10C illustrates an example of an error graph for identifying an error regarding a taxable medicare wages and tips being less than sum of taxable social security wages and tips, according to one embodiment.
Figure 10D:
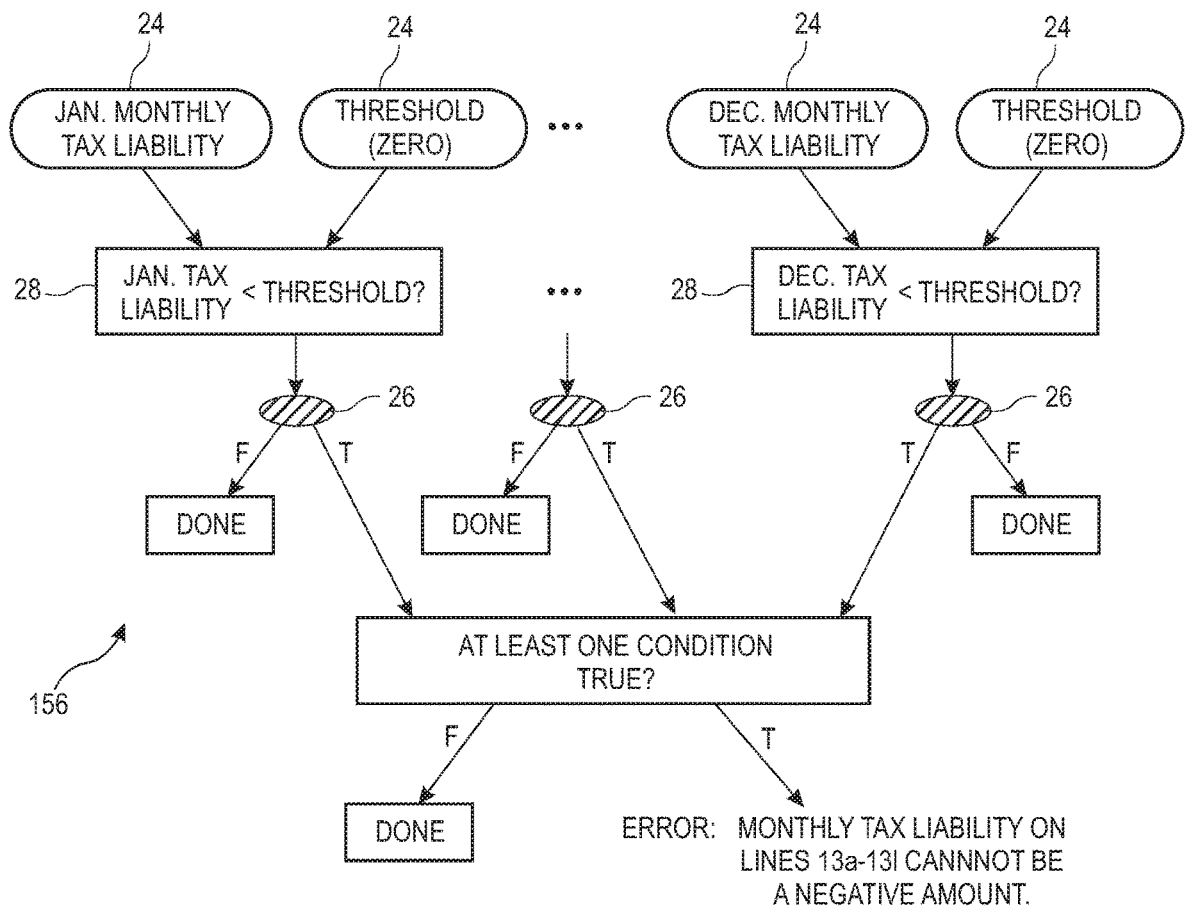
FIG. 10D illustrates an example of an error graph for identifying an error regarding entry of negative amounts for monthly tax liability, according to one embodiment.
Figure 10E:
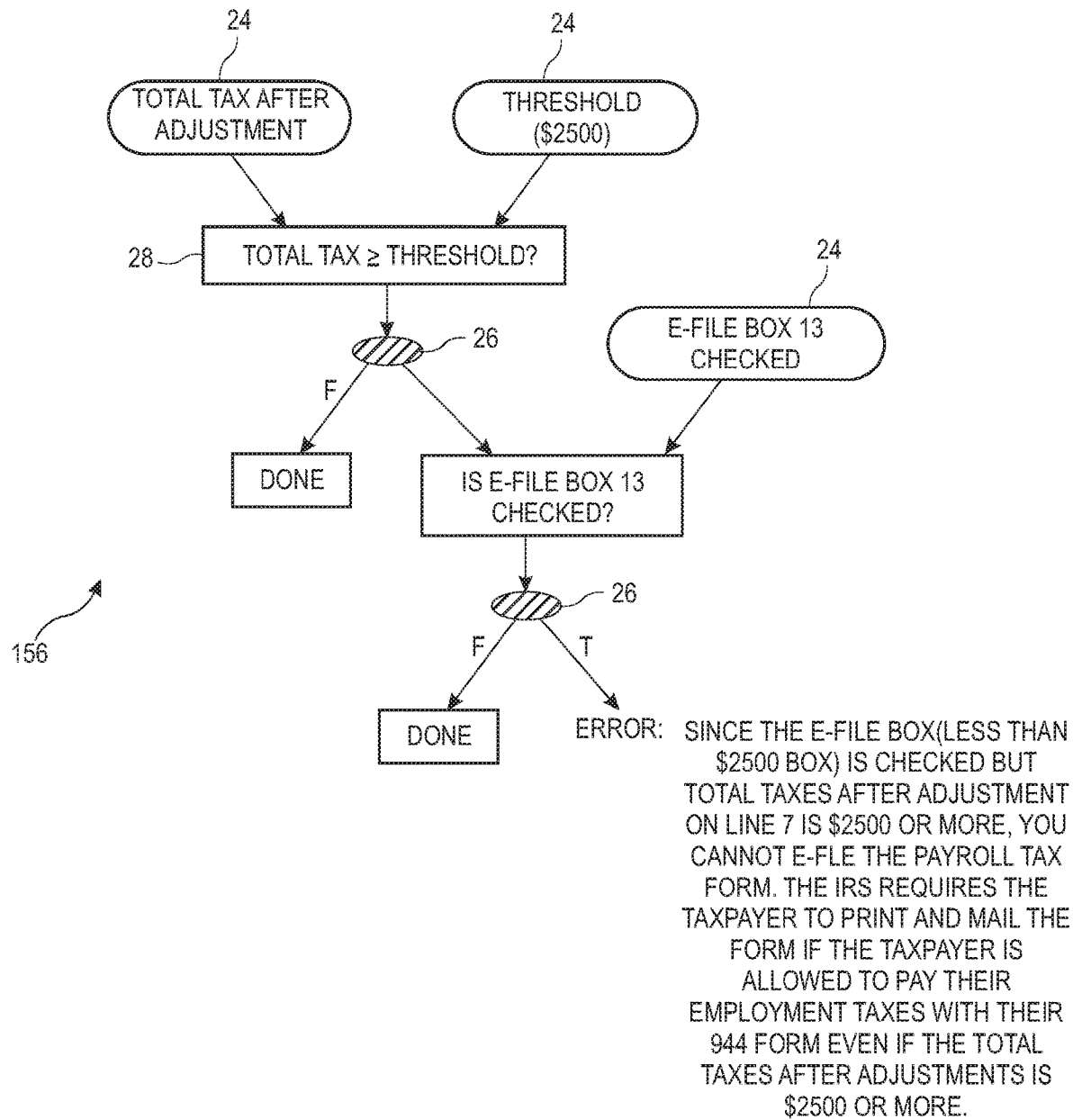
FIG. 10E illustrates an example of an error graph for identifying an error regarding a mismatch between checking a box that total tax after adjustment is less than a threshold (e.g., $2500), but total tax after adjustment is greater than the threshold, according to one embodiment.
Figure 10F:
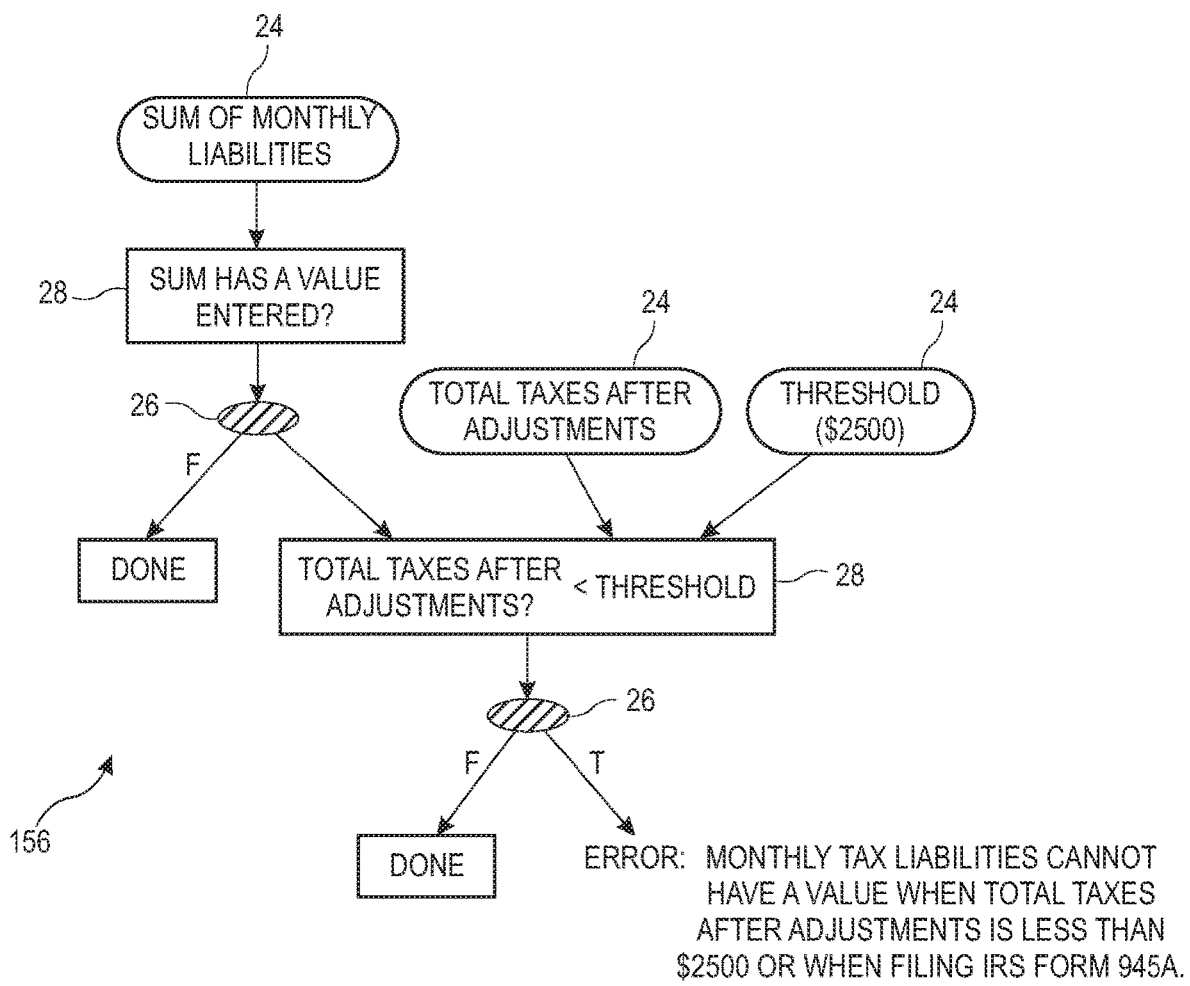
FIG. 10F illustrates an example of an error graph for identifying an error regarding entry of monthly tax liability amounts when total tax after adjustment is less than a threshold (e.g., $2500), according to one embodiment.
Figure 11:
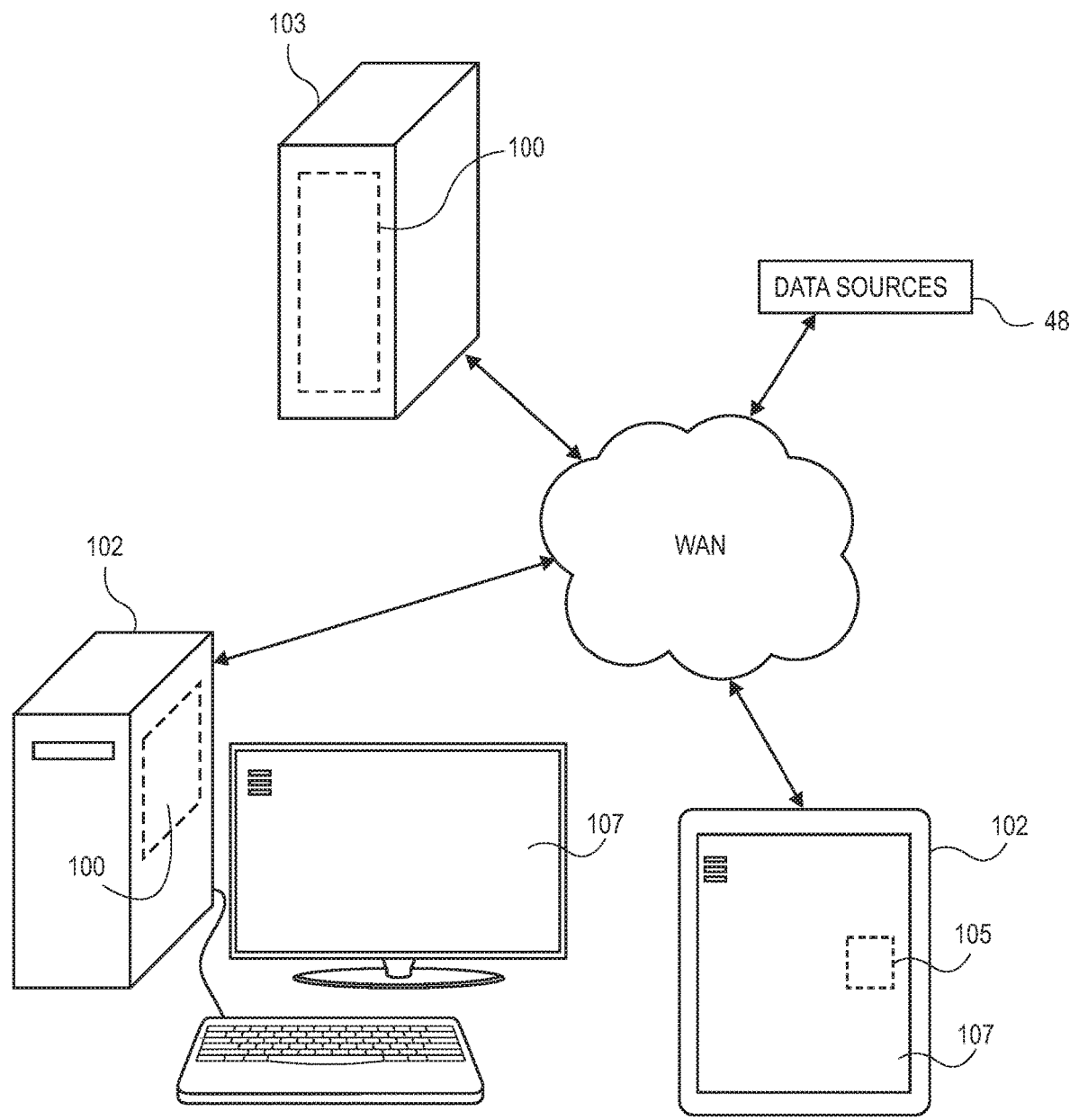
FIG. 11 illustrates the implementation of a compliance system having a compliance form preparation software application on various computing devices.

The error graphs 156 in FIGS. 10B-10E each include input nodes 24, function nodes 28 and functional nodes 26, similar to the error graph 156 in FIG. 10A, for identifying other various errors in the preparation of a payroll tax form. FIG. 10B illustrates an error graph 156 for identifying an error caused by a mismatch between a selection of the social security/medicare exempt box selected and the reporting of actual social security/medicare wages in preparing IRS Form 944 for 2015. FIG. 10C illustrates an error graph 156 for identifying an error regarding the reported taxable medicare wages and tips being less than the sum of taxable social security wages and tips in preparing IRS Form 944 for 2015. FIG. 10D illustrates an example of an error graph 156 for identifying an error caused by entry of negative amounts for monthly tax liability in preparing IRS Form 944 for 2015. FIG. 10E illustrates an example of an error graph 156 for identifying an error caused by checking a box that total tax after adjustment is less than a threshold (e.g., $2500), but the calculated total tax after adjustment is greater than the threshold in preparing IRS Form 944 for 2015.

The error check engine 150 is configured to process each of the error graphs 156 to identify whether there is an error in preparing the compliance form for which the respective error graph 156 is configured. The error check engine 150 simply traverses the nodes of the error graph 156, and accesses data for input nodes 24, performs functions for function nodes 28 and fills in the result of the functional nodes 26, as needed by the particular error graph 156.

Similar to the error explanations associated with error rules described above, the nodes of the error graphs 156 may be associated with a node error explanation which can be used to generate an narrative explanation of an error associated with a particular node or calculation path including such node. The node error explanation may include a narrative explanation, fragments, expressions, and/or partial statements. The error check engine 150 and/or explanation engine 154 are configured to utilize the node error explanations to generate a narrative explanation of errors identified according to a particular error graph 156, in the same or similar manner as that described above for error rules. For instance, a node error explanation associated with a node on error graph 156 of FIG. 9A may be a complete sentence such as "The total taxes after adjustment does not equal the total of the monthly liabilities. You must make the necessary adjustments to reconcile the amounts." The node error explanation may be a template having fillable fields and the error check engine 150 and/or explanation engine may be configured to provide the explanation as well as providing a description of the specific erroneous input, such as "The total tax after adjustment is $_____, which is not equal to the total of monthly liabilities which is $_____." As shown in the example above, the error explanation may also include a recommendation or requirement for correcting the error.

The errors identified by the error check engine 150 using the error graphs 156 and the explanations generated by the error check engine 150 and/or explanation engine 154 may be compiled into a report 155 for use by a user, the same as the errors and explanations regarding the error rules, as described above. Similarly, the explanation engine can transmit the error explanations to the UI controller 80 which can then display the explanations to a user, and/or utilize the errors in the process of data entry via the UI manager 82. The explanation engine 154 may be configured to utilize the narrative explanation, fragments, expressions, and/or partial statements of the error explanations associated with nodes of the error graphs 156 to generate natural language expressions that are more easily understood by a user, same or similar to the error explanations associated with the error rules.

In addition, the compliance system 40 can be configured to include both of the error checking systems, namely, the error checking utilizing the schema error module 152 and the error checking utilizing the error graphs 156. The errors and error explanations from both error checking systems can be compiled together into a report 155, and/or reported collectively to a user via the UI manager 82. Alternatively, the payroll system 40 can be configured to include only one of the error checking systems, either the schema error module 152 based system or the error graph 156 based system.

The algorithms for the operation of the compliance system 40 is described above, but a summary of the algorithms for the overall operation will now be described with reference to an exemplary compliance system 40 implemented on various computing devices, as shown in FIG. 12. A user initiates the compliance program 100 on a computing device 102, 103 as seen in FIG. 10, in order to prepare a particular type of compliance form for submission to an agency responsible for reviewing the compliance form. The compliance program 100 may present a compliance form selection screen to the user so that the user can select the desired type of compliance form to be processed. Alternatively, the compliance form may be automatically selected by the compliance program 100 based on a selection factor, such as a website being used by the user, a log-in identification of the user, other identification of the user, etc., which in some manner indicates the type of compliance form to be processed. The compliance program 100 may reside on the actual computing device 102 that the user interfaces with or, alternatively, the compliance program 100 may reside on a remote computing device 103 such as a server or the like as illustrated. In such an instances, the computing device 102 that is utilized by the user communicates via the remote computing device 103 using an application 105 contained on the computing device 102. The compliance program 100 may also be run using conventional Internet browser software. Communication between the computing device 102 and the remote computing device 103 may occur over a wide area network such as the Internet. Communication may also occur over a private communication network (e.g., mobile phone network).

A user initiating the compliance program 100, as explained herein, may import entity-specific compliance data from one or more data sources 48. Compliance data may also be input manually with user input 48a. The entity-specific compliance data is written to the shared data store 42, such as by populating the schema 44.

After entity-specific compliance data has been obtained, the calculation engine 50 computes one or more calculations and logic operations dynamically using the calculation graph 14 for the domain model 11 of the selected compliance form, based on the then available data at any given instance within the schema 44 in the shared data store 42. In some instances, estimates or educated guesses may be made for missing data. As the compliance program 100 is performing any of it operations, such importing compliance data or executing the calculation engine, the error check engine 150 and explanation engine 110 are executing to provide explanations, identify errors, generate error explanations, and provide the user with one or more narrative explanations regarding calculations or operations being performed. The errors and/or error explanations are reported to the user in a report or displayed to the user via the UI manager 82.

Concurrently, the logic agent 60 reads the run time data 62 which represents the instantiated representation of the canonical tax schema 44 at runtime. The logic agent 60 then utilizes the completeness graph 12 and/or decision tables 30 for the domain model 11 of the selected compliance form to generate and send non-binding suggestions 66 to the UI control 80. Alternatively, the logic agent 60 may determine that completeness has been achieved for the selected compliance form in which case a done instruction may be delivered to the UI control 80. If not done, the process continues whereby the user interface manager 82 will then process the suggestion(s) 66 using the user interface assets 19 for the domain model 11 of the selected compliance form, including the respective suggestion resolution element 88, user interface presentation 84, configuration file, interview screens, and/or forms. The user interface manager 82 then generates and presents a user interface presentation 84 to the user as seen whereby the user is presented with one or more prompts. The prompts may include questions, affirmations, confirmations, declaratory statements, and the like. The prompts are displayed on a screen 104 of the computing device 102 whereby the user can then respond to the same by using one or more input devices associated with the computing device 102 (e.g., keyboard, mouse, finger, stylus, voice recognition, etc.).

The response or responses that are given by the user of the compliance program 100 are then written to the shared data store 42 to thereby update all appropriate fields of the schema 44. The process then repeats and continues as explained above until a completeness state has been reached and a done instruction is sent to the UI control 80.

FIG. 12 generally illustrates components of a computing device 102, 103 that may be utilized to execute the software for automatically calculating and preparing a compliance form for electronic or paper submission. The components of the computing device 102/103 include a memory 300, program instructions 302, a processor or controller 304 to execute program instructions 302, a network or communications interface 306, e.g., for communications with a network or interconnect 308 between such components. The computing device 102, 103 may include a server, a personal computer, laptop, tablet, mobile phone, or other portable electronic device. The memory 300 may be or include one or more of cache, RAM, ROM, SRAM, DRAM, RDRAM, EEPROM and other types of volatile or non-volatile memory capable of storing data. The processor unit 304 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 308 may include a system bus, LDT, PCI, ISA, or other types of buses, and the communications or network interface may, for example, be an Ethernet interface, a Frame Relay interface, or other interface. The interface 306 may be configured to enable a system component to communicate with other system components across a network which may be a wireless or various other networks. It should be noted that one or more components of the computing device 102, 103 may be located remotely and accessed via a network. Accordingly, the system configuration illustrated in FIG. 14 is provided to generally illustrate how embodiments may be configured and implemented.

The method embodiments described herein may also be embodied in, or readable from, a non-transitory computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 304 performs steps or executes program instructions 302 within memory 300 and/or embodied on the carrier to implement the method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A system for preparing a plurality of types of compliance forms for submission to a respective responsible agency which reviews the compliance forms, comprising:
   a computing device having a computer processor and memory;
   a data store in communication with the computing device, the data store configured to store entity-specific compliance data for a plurality of compliance form data fields and calculated compliance form data fields;
   a compliance form software program executable by the computing device, the compliance software program having a calculation engine, a logic agent, a user interface manager, and a first domain model for preparing a first type of compliance form, the first domain model including a first calculation graph and a first completeness model;
   the first calculation graph defining data dependent calculations and logic operations for processing the first type of compliance form, the first calculation graph comprising a plurality of interconnected nodes including one or more of input nodes, function nodes, and functional nodes;
   the calculation engine configured to read the entity-specific compliance data from the shared data store, calculate a compliance calculation graph by performing calculations and logic operations based on the compliance calculation graph using the entity-specific compliance data, and write calculated compliance data to the shared data store;
   the first completeness model including one or more decision tables representing questions and logic for determining missing compliance data required to complete the first type of compliance form;
   the logic agent configured to read runtime data of the compliance form and utilize the first completeness model to evaluate missing compliance data needed to complete the compliance form and determine one or more suggested compliance questions for obtaining the missing compliance data;
   the user interface manager configured to receive the one or more suggested compliance questions from the logic agent, analyze the one or more suggested compliance questions, determine a compliance question to present to a user, and present the compliance question to the user;
   an error graph defining a plurality of error rules for identifying errors in the preparation of the compliance form, the error graph comprising a plurality of interconnected nodes including one or more of input nodes, function nodes, and functional nodes; and
   an error check engine configured to process the error graph to identify one or more errors in the preparation of the compliance form.

2. The system of claim 1, further comprising:
   a schema error module comprising a plurality of error rules in form of meta data generated from schema requirements for the compliance form, wherein the error check engine is configured to check the compliance form against the error rules to identify one or more errors in the preparation of the compliance form.

3. The system of claim 2, wherein the error check engine is integrated with the calculation engine.

4. The system of claim 1, further comprising:
   a services module configured to utilize the entity-specific compliance data and the calculated compliance data to: (a) generate an electronic document of a completed compliance form; (b) print a completed compliance form; or (c) electronically submit a completed compliance form to the responsible agency.

5. The system of claim 1, wherein the calculation engine, logic agent, and user interface manager are configured to operate on each one of a plurality of different domain models each for preparing a different type of compliance form, including the first domain model, and a second domain model for preparing a second type of compliance form, the second domain model including a second calculation graph and a second completeness model.

6. The system of claim 1, wherein one or more of the nodes of the first calculation graph are each associated with a respective explanation of a result of the node, and the system further comprises:
   an explanation engine configured to generate a narrative explanation utilizing an error explanation associated with the one or more nodes.

7. The system of claim 6, wherein the explanation engine includes a natural language generator configured to convert error explanations comprising fragments, expressions and partial statements into natural language expressions, such that the narrative explanation comprises a natural language expression.

8. The system of claim 6, wherein system is configured to automatically generate additional, more detailed narrative explanations in response to user prompts.

9. The system of claim 6, wherein the system is configured to execute the calculation engine to calculate the first calculation graph using a first set of entity-specific compliance data to determine a first value of a first node of the calculation graph, and to calculate the first calculation graph using a second set of entity-specific compliance data different than the first set of entity-specific compliance data to determine a second value of the first node, and the explanation engine is configured to generate an explanation of the difference between the first value and second value.

10. The system of claim 9, wherein the first set of entity-specific compliance data is for a first applicant at a first time, and the second set of entity-specific compliance data is for the first applicant at a second time different than the first time.

11. The system of claim 6, wherein the system is configured to execute the calculation engine to calculate the first calculation graph using a first set of entity-specific compliance data to determine a first value of a first node of the calculation graph using a first set of entity-specific compliance data, and to calculate a second calculation graph based on different compliance requirements than the first calculation graph and determining second value of a second node of the second calculation graph which corresponds to the same compliance concept as the first node of the first calculation graph, and the explanation engine is configured to generate an explanation of the difference between the first value and second value.

12. The system of claim 1, wherein the first domain model further comprises a plurality of user interface templates usable by the user interface manager to generate compliance questions for obtaining entity-specific compliance data.

13. The system of claim 12, wherein the user interface manager includes a set of policies for prioritizing the one or more suggested compliance questions for determining a compliance question to be presented to a user.

14. The system of claim 1, wherein the calculation engine, logic agent, and user interface manager are configured to operate with each one of a plurality of domain models each for preparing a different type of compliance form, wherein each of the different domain models includes a respective calculation graph and completeness model directed to a particular compliance form.

15. The system of claim 1, wherein the function nodes are determined based on the functional nodes and the input nodes.

16. A computer-implemented method for preparing a plurality of types of compliance forms for submission to a respective responsible agency which reviews the application, comprising:
a compliance form system executing a compliance form software program, the compliance form system comprising a computing device having a computer processor, memory and a data store in communication with the computing device, the data store configured to store entity-specific compliance data for a plurality of compliance form data fields and calculated compliance form data fields, the compliance software program having a calculation engine, a logic agent, a user interface manager, and a first domain model for preparing a first type of compliance form, the first domain model including a first calculation graph and a first completeness model, the first calculation graph defining data dependent calculations and logic operations for processing the first type of compliance form, the first calculation graph comprising a plurality of interconnected nodes including one or more of input nodes, function nodes, and functional nodes, the first completeness model including one or more decision tables representing questions and logic for determining missing compliance data required to complete the first type of compliance form;
the calculation engine reading the entity-specific compliance data from the shared data store, calculating the compliance calculation graph by performing calculations and logic operations based on the compliance calculation graph using the entity-specific compliance data, and writing calculated compliance data to the shared data store;
the logic agent reading runtime data of the compliance form, utilizing the first completeness model to evaluate missing compliance data needed to complete the compliance form, and determining one or more suggested compliance questions for obtaining the missing compliance data;
the user interface manager receiving the one or more suggested compliance questions from the logic agent, analyzing the one or more suggested compliance questions, determining a compliance question to present to a user, and presenting the compliance question to the user;
an error graph defining a plurality of error rules for identifying errors in the preparation of the compliance form, the error graph comprising a plurality of interconnected nodes including one or more of input nodes, function nodes, and functional nodes; and
an error check engine processing the error graph to identify one or more errors in the preparation of the compliance form.

17. The method of claim 16, wherein the calculation engine, logic agent, and user interface manager are configured to operate on each one of a plurality of different domain models each for preparing a different type of compliance form, including the first domain model, and a second domain model for preparing a second type of compliance form, the second domain model including a second calculation graph and a second completeness model, and the method further comprises:
the calculation engine reading entity-specific compliance data from the shared data store for preparing a second compliance form of the second type of compliance form, calculating the second calculation graph by performing calculations and logic operations based on the second calculation graph using the entity-specific compliance data, and writing second calculated compliance data to the shared data store;
the logic agent reading runtime data of the second compliance form, utilizing the first completeness model to evaluate missing compliance data needed to complete the second compliance form, and determining one or more second suggested compliance questions for obtaining the missing compliance data; and
the user interface manager receiving the one or more second suggested compliance questions from the logic agent, analyzing the one or more second suggested compliance questions, determining a second compliance question to present to a second user, and presenting the second compliance question to the second user.

18. The method of claim 16, wherein one or more of the nodes of the calculation graph are each associated with a respective error explanation of a result of the node, and the method further comprises:
an explanation engine generating a narrative explanation utilizing an error explanation associated with the one or more nodes.

19. The method of claim 18, further comprising:
the explanation engine converting the error explanation associated with a node into a natural language expressions, such that the narrative explanation comprises a natural language expression.

20. The method of claim 16, further comprising:
the calculation engine calculating the first calculation graph using a first set of entity-specific compliance data to determine a first value of a first node of the calculation graph;
the calculation engine calculating the first calculation graph using a second set of entity-specific compliance data different than the first set of entity-specific compliance data to determine a second value of the first node;
an explanation engine generating an explanation of the difference between the first value and second value.

21. The method of claim 16, further comprising:
a services module configured utilizing the entity-specific compliance data and the calculated compliance data and performing one or more of the following: (a) generating an electronic document of a completed compliance form; (b) printing a completed compliance form; or (c) electronically submitting a completed compliance form to the responsible agency.

22. The method of claim 16, wherein the function nodes are determined based on the functional nodes and the input nodes.

\* \* \* \* \*